United States Patent
Gyorfi et al.

(10) Patent No.: US 9,510,318 B2
(45) Date of Patent: Nov. 29, 2016

(54) METHOD AND APPARATUS FOR ASCERTAINING A LOCATION OF A PERSONAL PORTABLE WIRELESS COMMUNICATION DEVICE

(71) Applicant: MOTOROLA MOBILITY LLC, Chicago, IL (US)

(72) Inventors: Julius S. Gyorfi, Vernon Hills, IL (US); Sajid I. Dalvi, Aurora, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/309,290

(22) Filed: Jun. 19, 2014

(65) Prior Publication Data

US 2015/0005000 A1 Jan. 1, 2015

Related U.S. Application Data

(60) Provisional application No. 61/840,111, filed on Jun. 27, 2013.

(51) Int. Cl.
*H04W 24/00* (2009.01)
*H04W 64/00* (2009.01)
*G01S 5/02* (2010.01)

(52) U.S. Cl.
CPC .......... *H04W 64/006* (2013.01); *G01S 5/0252* (2013.01); *G01S 5/0257* (2013.01)

(58) Field of Classification Search
CPC . H04W 64/006; G01S 5/0252; G01S 5/0257
USPC .............. 455/456.1–456.3, 457; 340/539.13; 342/386, 451, 463; 701/500; 705/26.61
See application file for complete search history.

(56) References Cited

U.S. PATENT DOCUMENTS

| | | | |
|---|---|---|---|
| 8,031,120 B2* | 10/2011 | Smith et al. ................. | 342/451 |
| 8,576,073 B2 | 11/2013 | Mooring et al. | |
| 9,215,685 B2* | 12/2015 | Gupta ................... | G01S 5/0252 |
| 2007/0168127 A1* | 7/2007 | Zaruba et al. ............... | 701/220 |

(Continued)

FOREIGN PATENT DOCUMENTS

| | | |
|---|---|---|
| EP | 1500948 A1 | 1/2005 |
| EP | 2570772 A1 | 3/2013 |

(Continued)

OTHER PUBLICATIONS

WiFiSLAM, WiFiSLAM makes indoor location a reality, 111. wifislam.com, Feb. 4, 2013, all pages.

(Continued)

*Primary Examiner* — Amancio Gonzalez
(74) *Attorney, Agent, or Firm* — Morris & Kamlay LLP

(57) ABSTRACT

A method and apparatus can ascertain a location of a personal portable wireless communication device. Movement of the personal portable wireless communication device can be sensed using a plurality of movement sensors on the personal portable wireless communication device. Wireless network signal strengths can be measured by the personal portable wireless communication device. A location of the personal portable wireless communication device can be ascertained based on the sensed movement of the personal portable wireless communication device and the measured wireless network signal strengths through Bayesian filtering.

21 Claims, 25 Drawing Sheets

(56) References Cited

U.S. PATENT DOCUMENTS

| | | | |
|---|---|---|---|
| 2012/0203453 A1 | 8/2012 | Lundquist et al. | |
| 2013/0158941 A1 | 6/2013 | Yang et al. | |
| 2013/0317944 A1* | 11/2013 | Huang et al. | 705/26.61 |
| 2014/0194143 A1* | 7/2014 | Krainz | G01S 5/0252 455/456.1 |

FOREIGN PATENT DOCUMENTS

| | | |
|---|---|---|
| WO | 2004095790 A1 | 11/2004 |
| WO | 2012095922 A1 | 7/2012 |
| WO | 201210675 A1 | 8/2012 |
| WO | 2012135726 A1 | 10/2012 |
| WO | 2013034585 A1 | 3/2013 |

OTHER PUBLICATIONS

Huang, Joseph et al.: "Efficient, Genralized Indoor WiFi GraphSLAM", Preprint submitted to 2011 IEEE International Conference on Robotics and Automation, received Sep. 13, 2010, all pages.

International Search Report and Written Opinion issued Nov. 4, 2014 in corresponding International Application No. PCT/US2014/044563.

\* cited by examiner

METHOD AND APPARATUS FOR ASCERTAINING A LOCATION OF A PERSONAL PORTABLE WIRELESS COMMUNICATION DEVICE

BACKGROUND

1. Field

The present disclosure is directed to a method and apparatus for ascertaining a location of a personal portable wireless communication device. More particularly, the present disclosure is directed to ascertaining a location of a personal portable wireless communication device based on sensed movement of the device and measured wireless network signal strengths.

2. Introduction

Presently, some wireless communication devices can determine their locations based on signals received at the devices. For example, a wireless communication device can determine its location based on Global Positioning System (GPS) signals, cellular signals, or other signals. The location can be used to find directions on a map, to locate a device user during an emergency, to provide social networking updates, to tag photographs with the location, to locate points of interest proximal to the device, and for other location purposes.

Unfortunately, the location is subject to errors that result in the determination of an inaccurate location. For example, GPS location determination techniques suffer from accuracy problems and are subject to problems when GPS signals cannot be received, such as when the device is indoors, underground, or among tall buildings. Furthermore, cell tower location triangulation determination techniques suffer from similar and other errors. Other location determination techniques, such as wireless local area network location determination and dead reckoning location determination techniques, also suffer from similar and other errors, such as errors caused by reflective surfaces, multipath issues, dead-spot issues, noise issues, interference issues, sensor inaccuracy issues, and other issues. These errors make it difficult to accurately determine the location of a device.

Thus, there is a need for a method and apparatus for ascertaining a location of a personal portable wireless communication device.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for ascertaining a location of a personal portable wireless communication device. According to one embodiment, a method can include sensing movement of the personal portable wireless communication device using a plurality of movement sensors on a personal portable wireless communication device. The method can include the personal portable wireless communication device measuring wireless network signal strengths. The method can include ascertaining a location of the personal portable wireless communication device based on the sensed movement of the personal portable wireless communication device and the measured wireless network signal strengths through Bayesian filtering.

Figure 1:
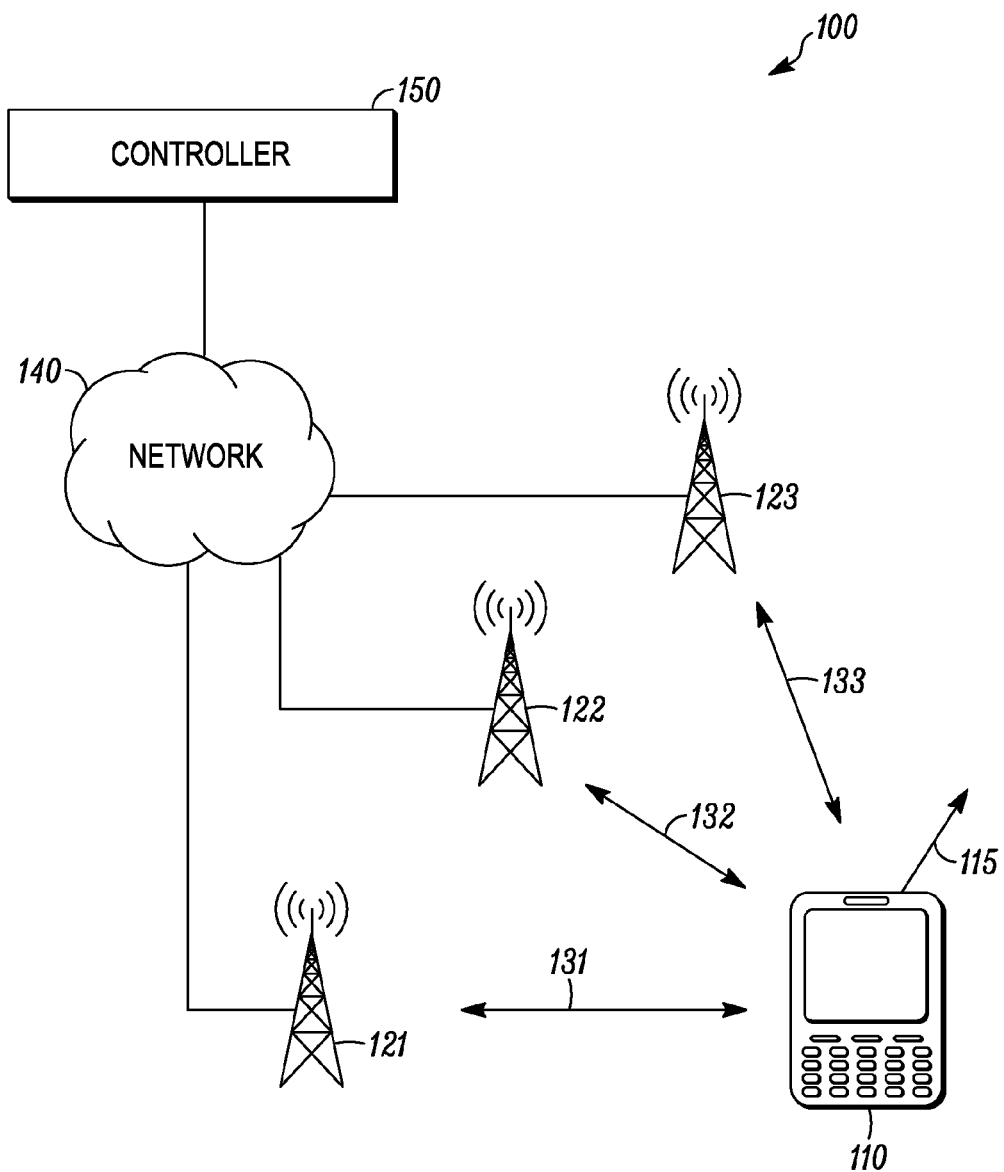
FIG. 1 is an example block diagram of a system according to a possible embodiment.

FIG. 1 is an example block diagram of a system 100 according to a possible embodiment. The system 100 can include a personal portable wireless communication device 110, access points 121-123, access point signals 131-133, a network 140, and a network controller 150. The personal portable wireless communication device 110 can be a wireless communication device, a wireless telephone, a cellular telephone, a smartphone, a personal digital assistant, a pager, a personal computer, a selective call receiver, a tablet computer, a wearable device, such as a necklace, an earpiece, glasses, or a limb band that can be a watch, an arm band, a ring, a bracelet, an anklet, or other limb band that can be worn on a user's limb, or any other device that is capable of sending and receiving communication signals on a network including a wireless network. The access points 121-123 can be Wireless Local Area Network (WLAN) access points, cellular network base stations, satellites, or other wireless network access points. For example, the access points 121-123 can be part of the network 140 and can provide access between the personal portable wireless communication device 110 and the network 140. Access points 121-123 can communicate with the personal portable wireless communication device 110 using network wireless communication signals 131-133 or other communication signals.

The network controller 150 can be connected to the network 140. The network controller 150 may be located at a server, at an access point, at a radio network controller, or anywhere else on the network 140. The network 140 may include any type of network that is capable of sending and receiving signals, such as wireless signals. For example, the network 140 may include a wireless communication network, a WLAN, such as an 802.11-based network, an 802.16-based network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, and other communications systems. Furthermore, the network 140 may include more than one network and may include a plurality of different types of networks. Thus, the network 140 may include a plurality of data networks, a plurality of telecommunications networks, a combination of data and telecommunications networks and other like communication systems capable of sending and receiving communication signals.

Figure 2:
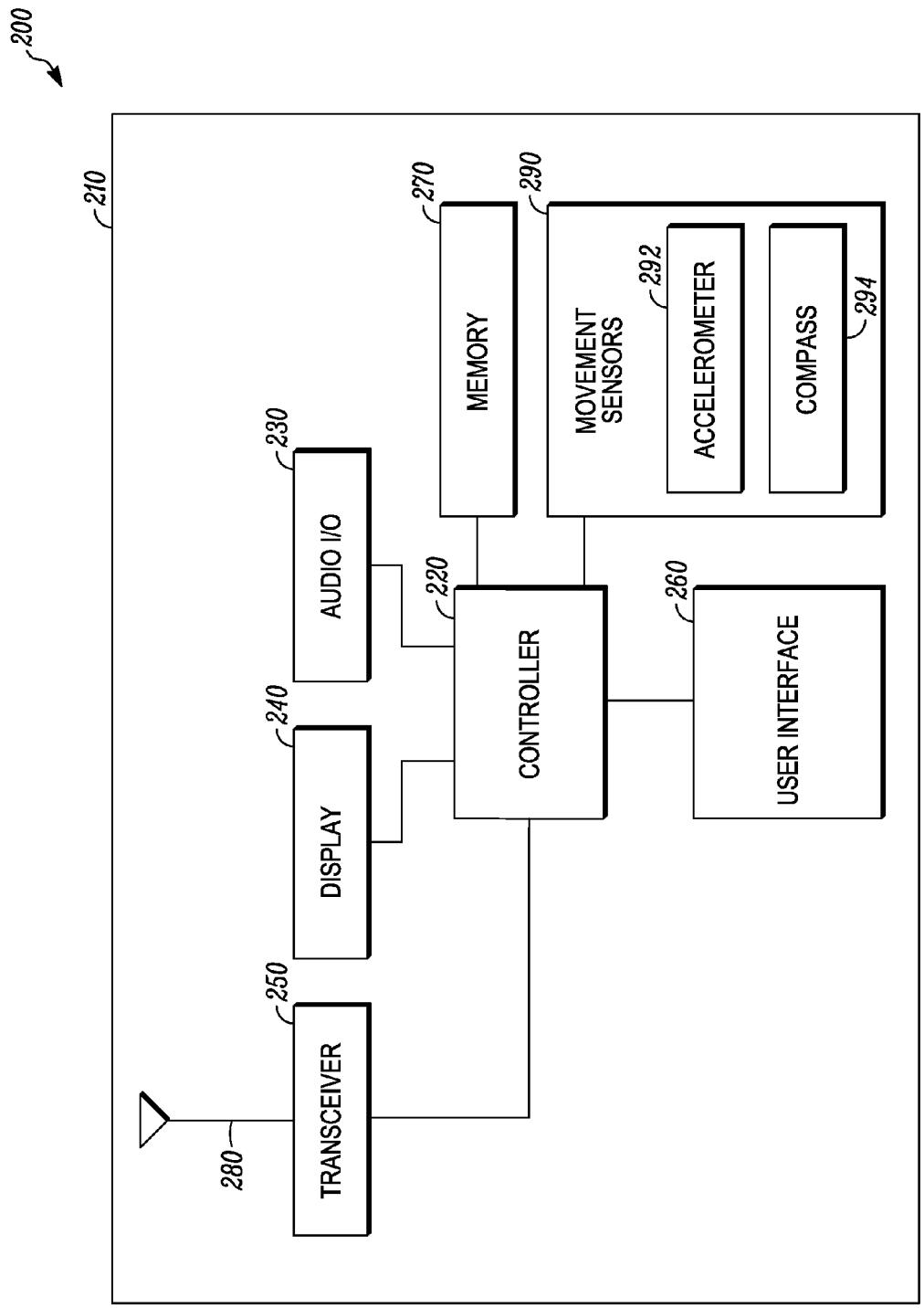
FIG. 2 is an example block diagram of a wireless communication device according to a possible embodiment.

FIG. 2 is an example block diagram of a wireless communication device 200, such as the personal portable wireless communication device 110, according to a possible embodiment. The wireless communication device 200 can include a housing 210, a controller 220 within the housing 210, audio input and output circuitry 230 coupled to the controller 220, a display 240 coupled to the controller 220, a transceiver 250 coupled to the controller 220, a user interface 260 coupled to the controller 220, a memory 270 coupled to the controller 220, and an antenna 280 coupled to the transceiver 250. The wireless communication device 200 can also include movement sensors 290, such as an accelerometer 292, a compass 294, and other movement sensors.

The display 240 can be a liquid crystal display (LCD), a light emitting diode (LED) display, a plasma display, a projection display, a touch screen, or any other device that displays information. The transceiver 250 may include a receiver and/or a transmitter. The audio input and output circuitry 230 can include a microphone, a speaker, a transducer, or any other audio input and output circuitry. The user interface 260 can include a keypad, buttons, a touch pad, a joystick, a touch screen display, another additional display, or any other device useful for providing an interface between a user and an electronic device. The memory 270 can include a random access memory, a read only memory, an optical memory, a subscriber identity module memory, a flash memory, a removable memory, a hard drive, a cache, or any other memory that can be coupled to a wireless communication device. The wireless communication device 200 can perform the methods described in the embodiments.

Figure 3:
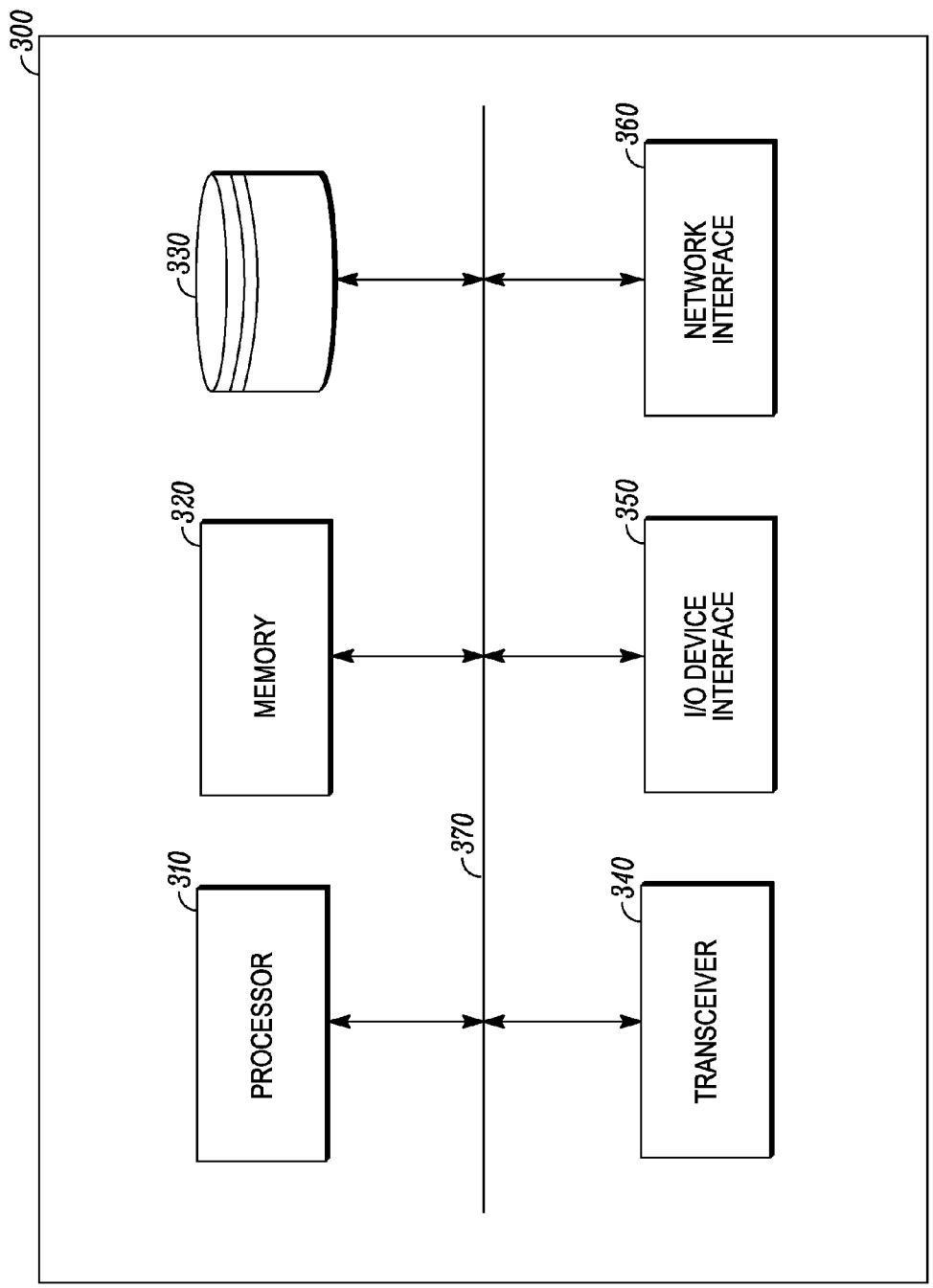
FIG. 3 is an example block diagram of a network controller according to a possible embodiment.

FIG. 3 is an example block diagram of a network controller 300, such as the controller 150, according to a possible embodiment. The controller 300 may include a processor 310, a memory 320, a database interface 330, a transceiver 340, an Input/Output (I/O) device interface 350, a network interface 360, and a bus 370. The controller 300 may implement any operating system, such as Microsoft Windows®, UNIX, or LINUX, for example. Controller operation software may be written in any programming language, such as C, C++, Java or Visual Basic, for example. The controller software may run on an application framework, such as, for example, a Java® server, a .NET® framework, or any other application framework.

The transceiver 340 may create a data connection with the personal portable wireless communication device 110. The processor 310 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the processor 310 may be any controller or processor device or devices capable of implementing the disclosed embodiments.

The memory 320 may include volatile and nonvolatile data storage, including one or more electrical, magnetic, or optical memories, such as a Random Access Memory (RAM), cache, hard drive, or other memory device. The memory 320 may have a cache to speed access to specific data. The memory 320 may also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data may be stored in the memory 320 or in a separate database. For example, the database interface 330 may be used by the processor 310 to access the database.

The I/O device interface 350 may be connected to one or more input and output devices that may include a keyboard, a mouse, a touch screen, a monitor, a microphone, a voice-recognition device, a speaker, a printer, a disk drive, or any other device or combination of devices that accept input and/or provide output. The network connection interface 360 may be connected to a communication device, modem, network interface card, a transceiver, or any other device capable of transmitting and receiving signals to and from the network 140. The components of the controller 300 may be connected via the bus 370, may be linked wirelessly, may be distributed across a network, or may be otherwise connected.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

Figure 4:
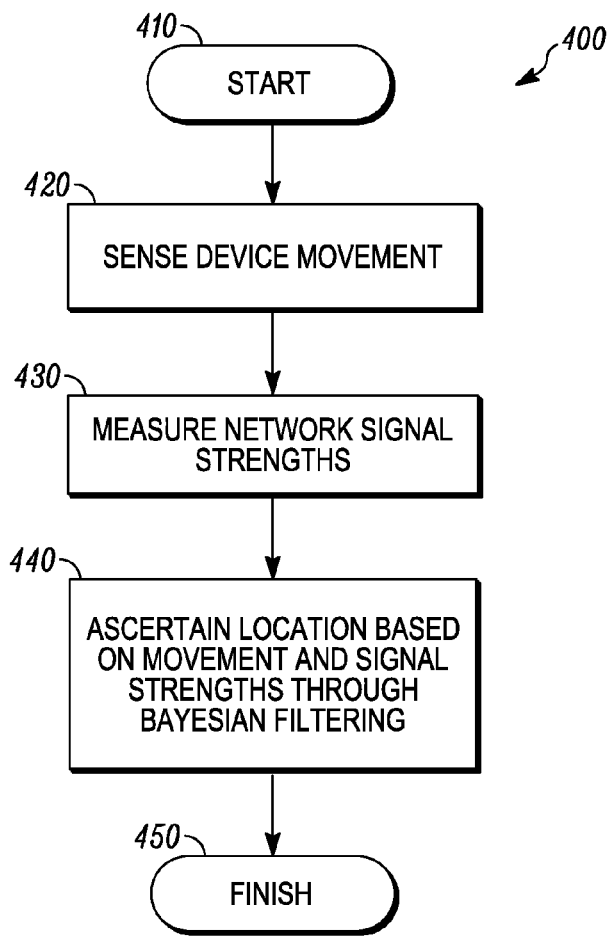
FIG. 4 is an example flowchart illustrating a method of operation of a personal portable wireless communication device according to a possible embodiment.

FIG. 4 is an example flowchart 400 illustrating a method of operation of the personal portable wireless communication device 110, such as the wireless communication device 200, according to a possible embodiment. At 410, the flowchart can begin.

At 420, the device 110 can sense movement of the personal portable wireless communication device 110 using a plurality of movement sensors. The plurality of movement sensors on the device 110 can include the accelerometer 292 and the sensed movement of the device 110 can be based on a distance traversed based on readings from the accelerometer 292. For example, a distance traversed can be calculated based on pedometry information, such as steps taken, determined from accelerometer readings and the sensed movement can include the distance traversed. The plurality of movement sensors on the device 110 can also include the compass 294 and the sensed movement of the device 110 can be based on directional information based on readings from the compass 294. For example, directional information can include a heading calculated from compass readings and the sensed movement can include the directional information. The sensed movement of the device 110 can be a deduced (dead) reckoning movement.

At 430, the device 110 can measure wireless network signal strengths. The wireless network signal strengths can be measured from signals 131-133 from access points 121-123 on a wireless network. The access points 121-123 can be WLAN access points, base stations, satellites, or any other access points that provide signals to a personal portable wireless communication device. For example, the device 110 can measure wireless network signal strengths by measuring received signal strength indicators of a WLAN. The WLAN can be an 802.11-based network, a 802.16-based network, or any other WLAN. The wireless network signal strengths can also be from a cellular network, a Global Positioning System (GPS) network, or any other wireless network.

At 440, the device 110 can ascertain a location of the device 110 based on the sensed movement of the device 110 and the measured wireless network signal strengths through Bayesian filtering. For example, the device 110 can ascertain its location by identifying a region within which the device 110 may be located based on sensed movement measurements and uncertainties of the plurality of movement sensors and by assigning weights to a set of locations within the region. The weights can be based on a probability of measuring particular wireless network signal strength values at the locations within the region. According to a possible implementation, the Bayesian filtering can include estimating the location of the device 110 based on a weighted sum of the locations within the region. According to another possible implementation, Bayesian filtering can also include identifying a region within which the personal portable wireless communication device may be located based on sensed movement measurements and based on uncertainties of the plurality of movement sensors, can include assigning weights to a set of locations within the region, where the weights are based on a probability of measuring particular wireless network signal strength values at the locations within the region, and can include ascertaining a location of the personal portable wireless communication device based on a weighted sum of the locations within the region.

The probability of measuring the particular wireless network signal strength values at the locations within the region can be calculated as a product of probabilities of measuring each particular individual wireless network signal strength value at a location. The probability of measuring a particular wireless network signal strength value at a location in the region can be calculated by: (1) comparing the wireless network signal strength value to values in a wireless network signal strength database, where the wireless network signal strength database can include a grid of locations; (2) finding a plurality of nearest neighbors to the location in the database grid; (3) performing an interpolation of the means and variances of the nearest neighbors; and (4) calculating the probability of measuring the wireless network signal strength value given a normal distribution with the interpolated mean and variance values. Each location in the grid of locations can be associated with a mean wireless network signal strength value and a wireless network signal strength variance value.

The plurality of nearest neighbors can include an odd number of nearest neighbors, an even number of nearest neighbors, such as the four nearest neighbors, or any other number of nearest neighbors. The wireless network signal strength database can be received by the device 110 from the wireless network. For example, the device 110 can receive the wireless network signal strength database when accessing, coming within range of, and/or joining the wireless network.

Performing an interpolation can include performing a bilinear interpolation of the means and variances of the nearest neighbors. For example, interpolation can include estimating a value of a function for an intermediate value of an independent variable. A number of data points, obtained by sampling or experimentation, can represent the values of the function for a limited number of values of the independent variable. Bilinear interpolation can be used to interpolate functions of two variables on a two-dimensional grid.

According to a possible implementation, the region can be a particle cloud, a radius around the device 110, a set of possible locations of the device 110, or any other region within which the device 110 may be located. As a further example, each particle in a particle cloud can represent a possible position of the device 110 based on dead reckoning and WLAN signal strength measurements. The size or spread of the particle cloud can represent positional uncertainty, such as an amount of uncertainty, of a position of the device 110 due to dead reckoning. Each particle can have a particle weight based on a probability that the device 110 is located at a position of a particle. The particle weight can be based on the WLAN measurements.

According to another possible implementation, the Bayesian filtering can include recursive Bayesian estimation. The particle cloud can be propagated forward using dead reckoning measurements, based on the sensed movement of the device 110. For example, the dead reckoning measurements can include a distance measurement from a pedometer and a heading measurement from a compass, subject to increasing uncertainty in position. A size of the particle cloud can reflect an amount of uncertainty in a position of the device 110. For example, the particle cloud can grow in size to reflect the increasing uncertainty in position. To elaborate, to combine dead reckoning and wireless network signal strength measurements via Bayesian estimation through a particle filter, the particle filter can include a cloud of particles $\{x_i\}$ in an environment where each particle can represent a possible position of the device 110. The size of the particle cloud can reflect the amount of uncertainty in the position. The particle cloud can be propagated forward using dead reckoning. Dead reckoning errors can be modeled as process noise within the Bayesian filtering framework and incorporated into particle cloud updates as normally distributed errors in distance and heading. The particle cloud can act as a filter to provide additional certainty to the dead reckoning movement by updating the weight of each particle based on the probability of measuring received signal strength values at each particle's location.

Ascertaining a location of the device 110 can also include normalizing the weights so that a sum of the weights equals one. This is because the weights can comprise a probability mass function. The normalized weights can be assigned to the set of locations within the region. At 450, the flowchart 400 can end.

Figure 5:
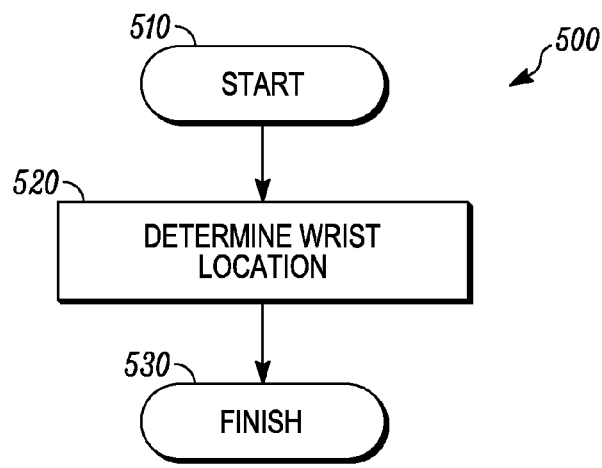
FIG. 5 is an example flowchart illustrating a method of operation of a personal portable wireless communication device according to a possible embodiment.

FIG. 5 is an example flowchart 500 illustrating a method of operation of the device 110, such as the wireless communication device 200, according to a possible embodiment. The device 110 can be a wrist band including the plurality of movement sensors and a transceiver configured to communicate with a wireless network. For example, the wrist band can be a wristwatch and the plurality of movement sensors can be located on a user's wrist. At 510, the flowchart can begin. At 520, the device 110 can determine which wrist of a user the wrist band is located on based on readings from the plurality of movement sensors. At 530, the flowchart 500 can end.

According to other implementations, the device 110 can be a limb-band device configured to be worn on a limb, such as an arm or leg, of a user. The device 110 can further be a cell phone, a smartphone, a personal digital assistant, a wearable device, a device located in a pocket of a user, a device clipped to a belt of a user, a device located in clothing, shoes, headgear, or sports accessories of a user, or any other personal portable wireless communication device.

Figure 6:
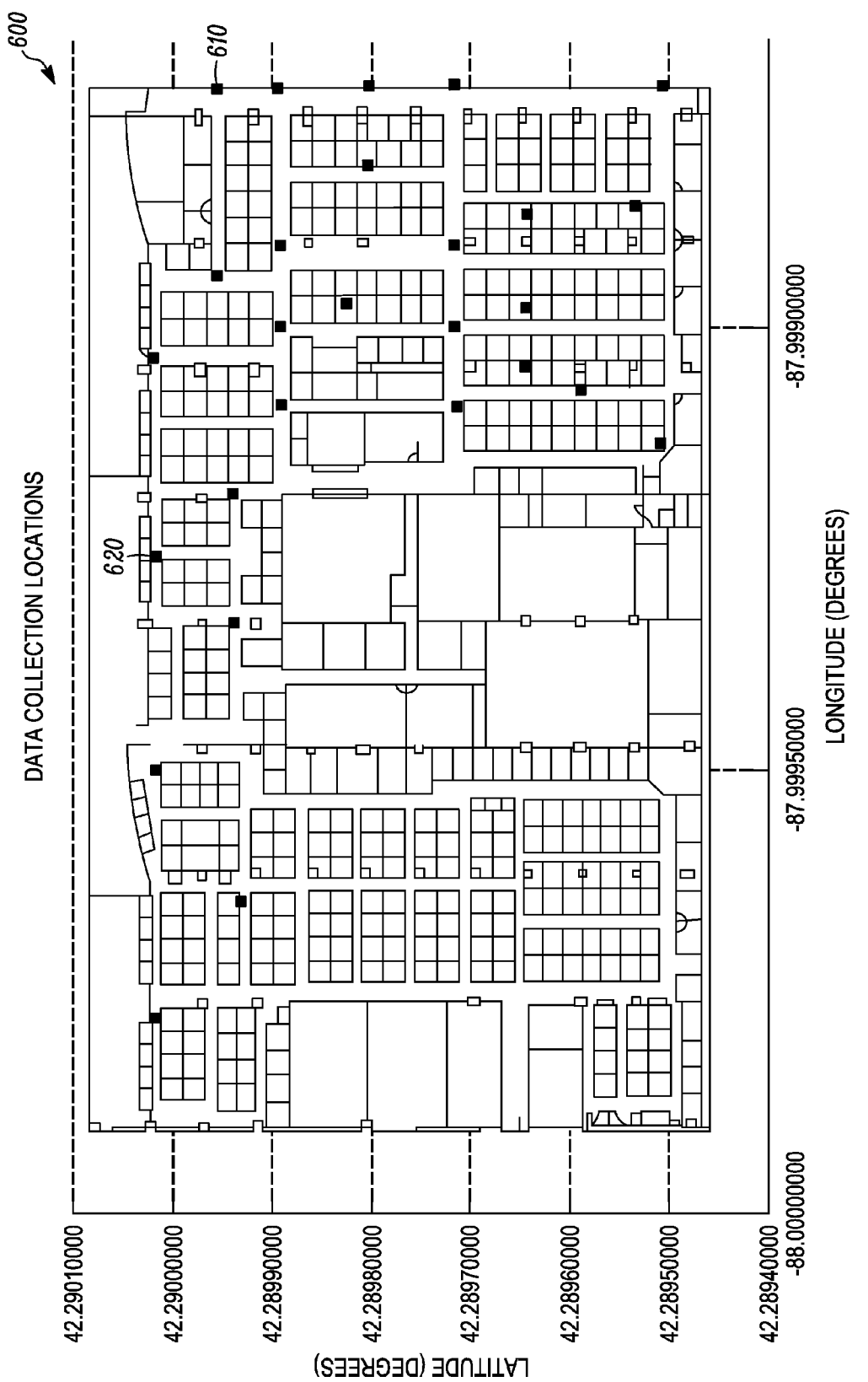
FIG. 6 is an example illustration of an office area including data collection locations according to a possible embodiment.

FIG. 6 is an example illustration of an office area 600 including data collection locations, such as data collection locations 610 and 620, according to a possible embodiment. A wireless network signal strength database can be generated by performing wireless network scans at known locations, such as in the office area 600, during training. For example, a device can scan for wireless signals from the access points 121-123. Any device useful for detecting wireless network signals can be used to perform the scans for training. Data from the scans can be uploaded to a server, such as the controller 150.

Figure 7:
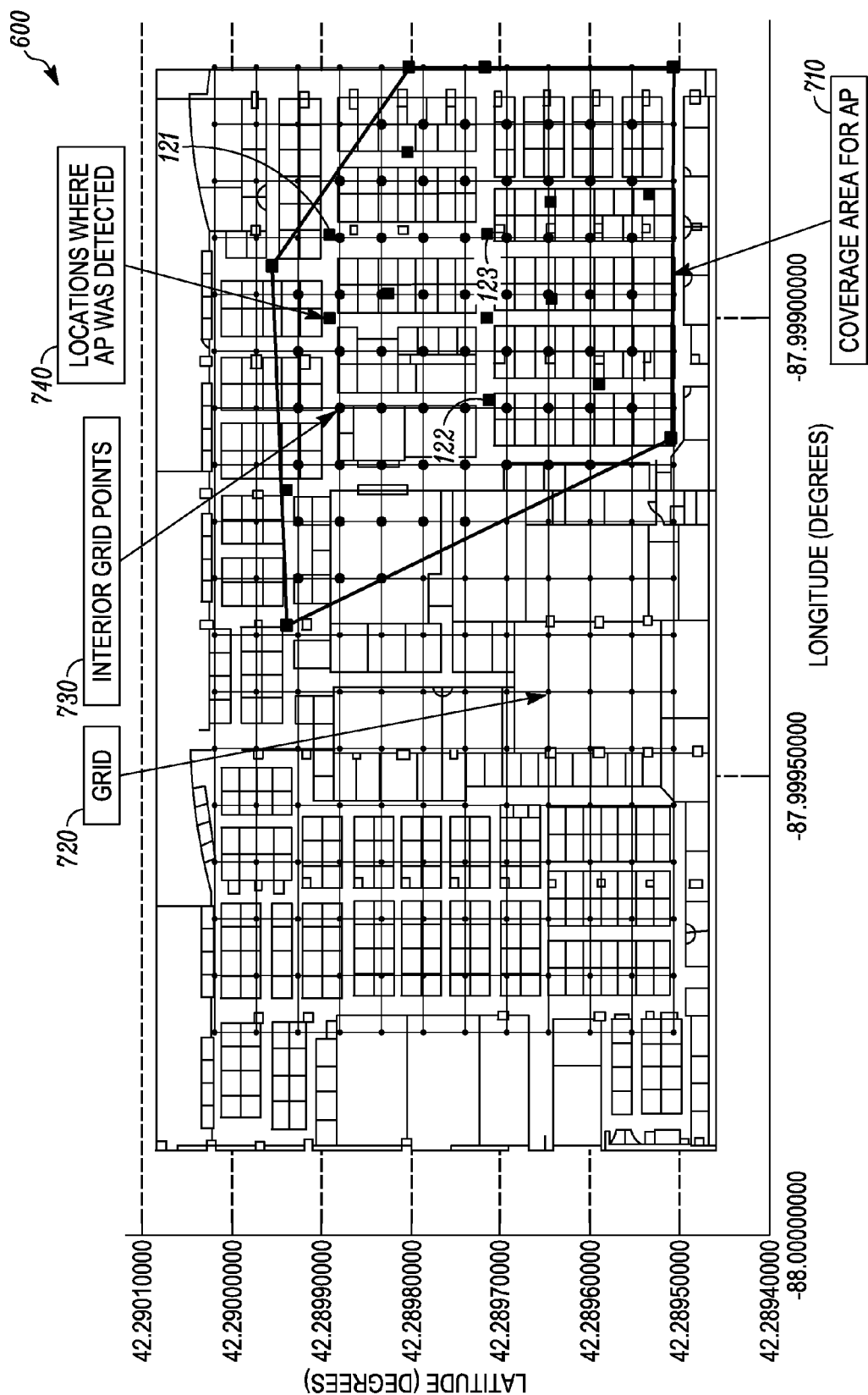
FIG. 7 is an example illustration of a coverage area of access points according to a possible embodiment.
Figure 8A:
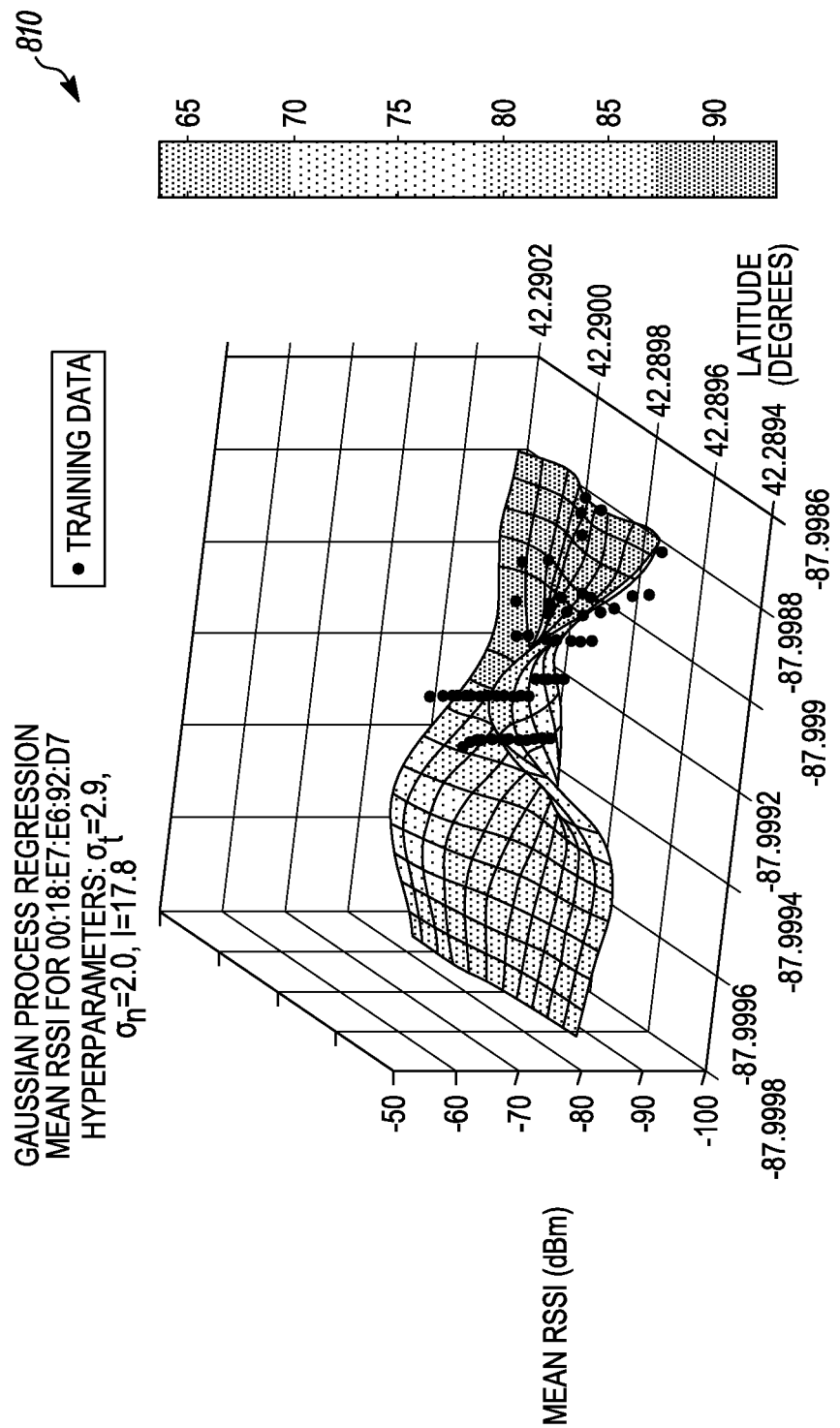
FIGS. 8A-8D are example illustrations of mean and variance plots according to a possible embodiment.
Figure 8B:
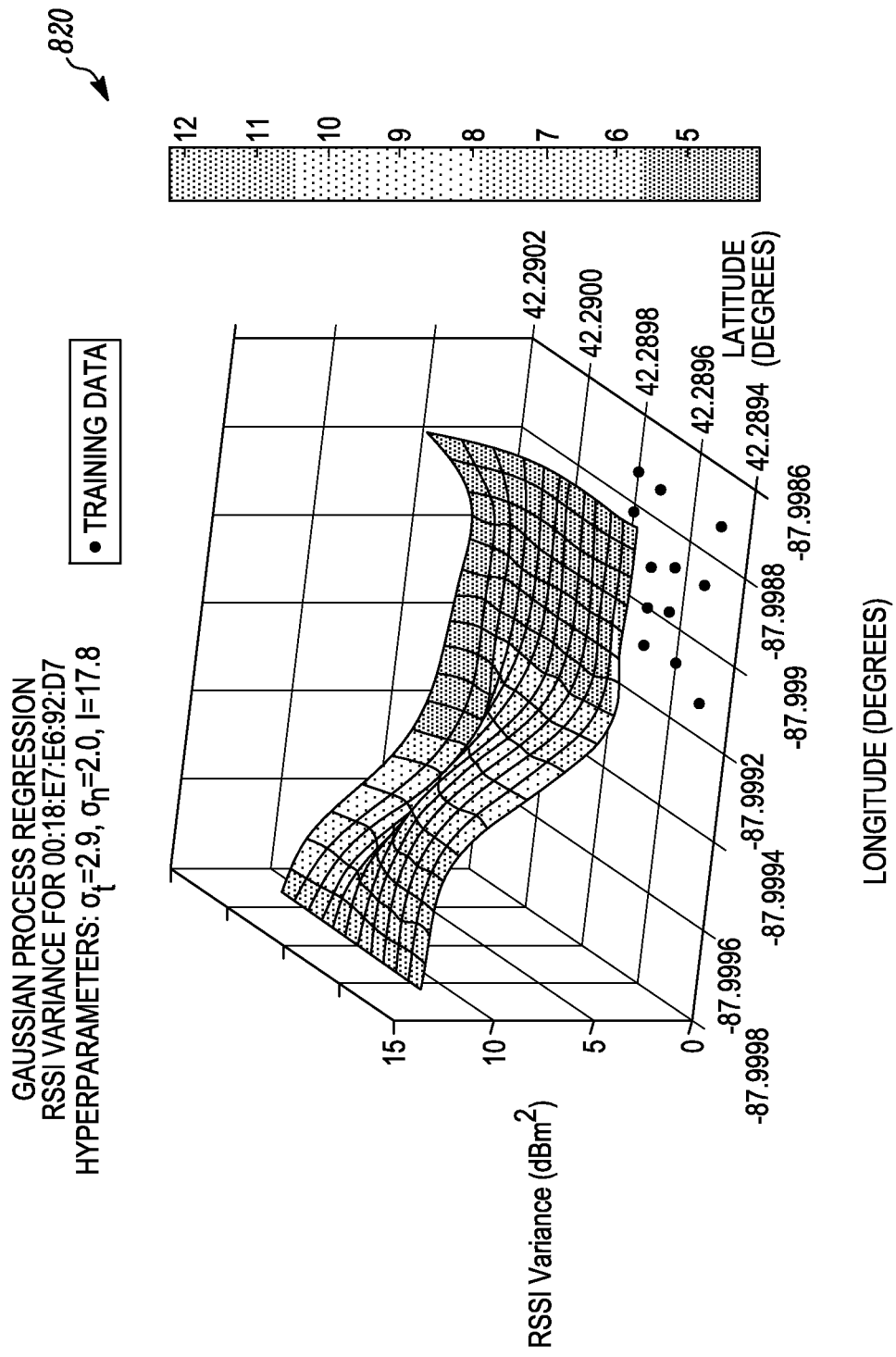
Figure 8C:
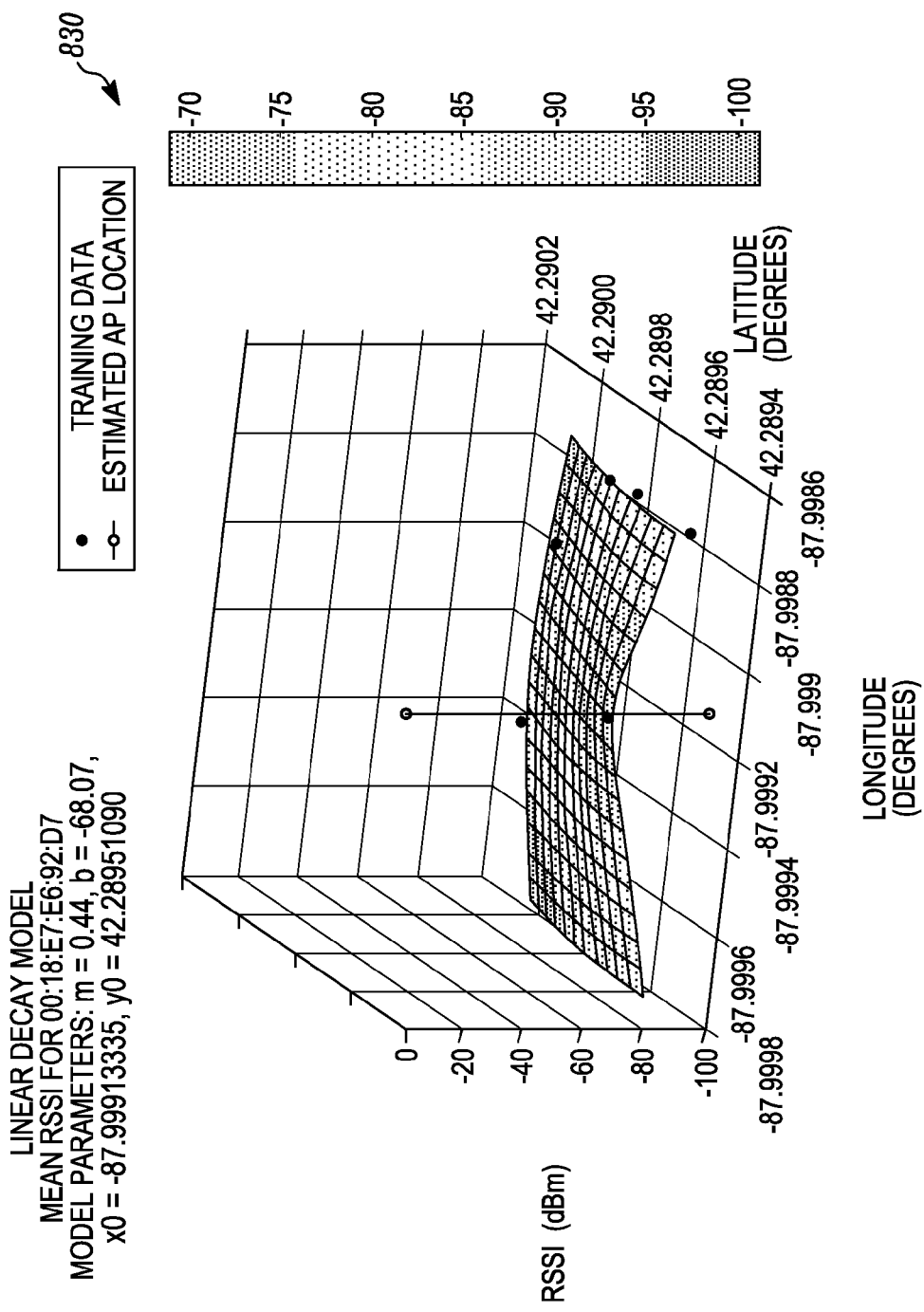
Figure 8D:
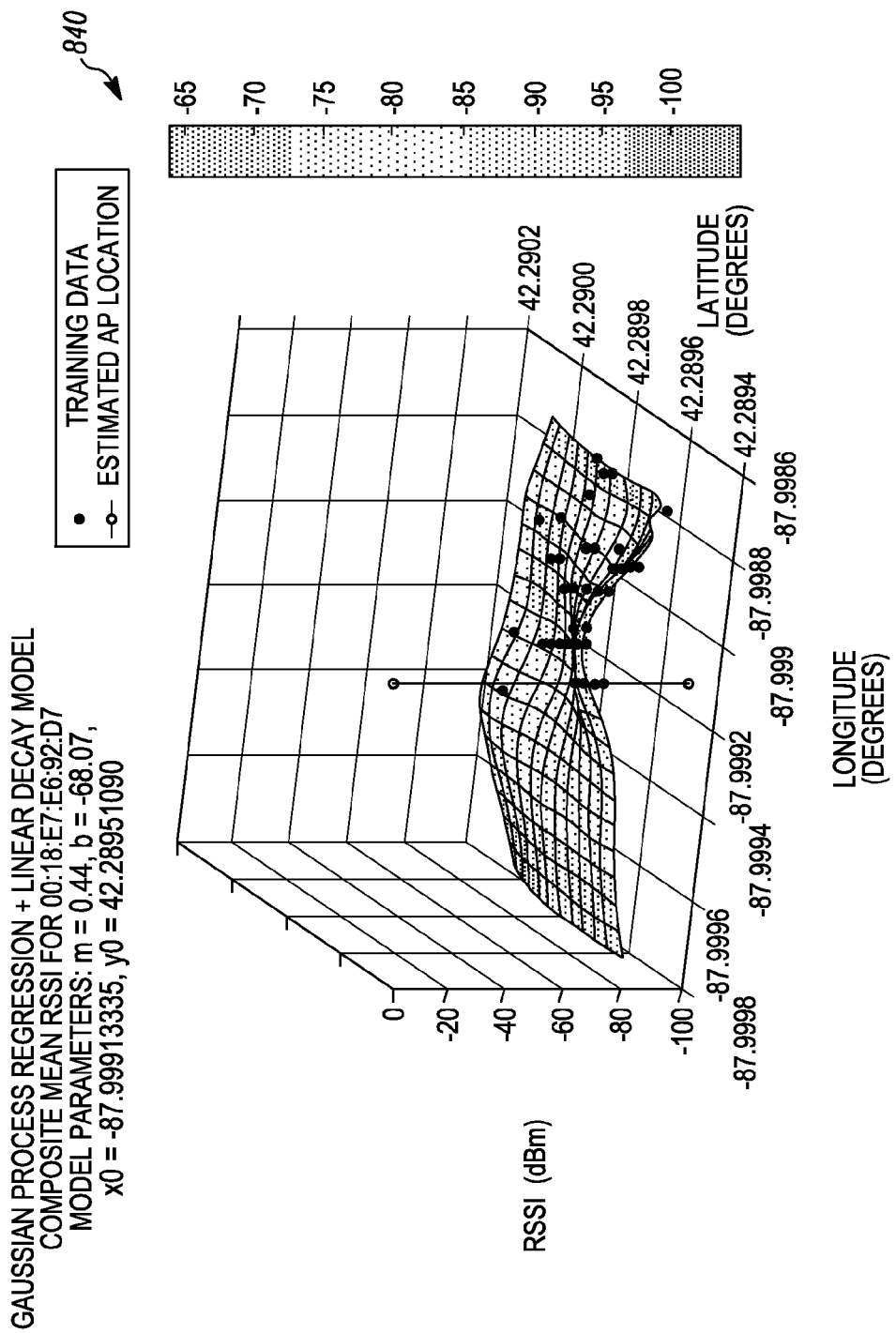

FIG. 7 is an example illustration of a coverage area 710 for a single access point, such as access point 121, according to a possible embodiment. The coverage area 710 can be assessed with respect to a grid 720 and can include interior grid points 730 and locations 740 where the access point was detected. The server can generate a grid, such as the grid 720, of variable size ($n_x \times n_y$) to cover the mapped space, such as space in the floor plan 600. The coverage area 710 can correspond to the convex hull of locations 740 where the access point was detected.

FIGS. 8A-8D are example illustrations of mean and variance plots according to a possible embodiment. The mean and variance plots can include a Gaussian process regression mean Received Signal Strength Indicator (RSSI) plot 810 and a Gaussian process regression RSSI variance plot 820. The Gaussian process regression interpolation can be most accurate within the convex hull of locations at which the access point was detected. Outside this region, the extrapolation can be poor. A better method of extrapolation can be to use a linear decay model, such as the mean RSSI plot 830. Combining the Gaussian process interpolation with the convex hull and the linear decay model extrapolation outside the convex hull results in the Gaussian process regression and linear decay model composite mean RSSI plot 840. For each of $n_z$ access points in the training data, the server can estimate the signal strength mean and variance at each grid point, such as by using Gaussian Process Regression (GPR) interpolation or by using other methods to estimate the signal strength mean and variance. For extrapolation, a linear decay model can be fit to the measurements in a least-squares sense with the model parameters, such as access point location, peak value, and slope, being estimated via constrained non-linear optimization, such as by conjugate gradient descent. If an access point location is known, then only the peak value and slope may be estimated. The server can store the resulting $n_x \times n_y \times n_z$ array of means and variances in a wireless network signal strength database, such as a WLAN database, for downloading to the device 110.

The mean and variance values at the grid points can be provided to a client application on the device 110 via a downloadable database file. The size of the database can be dependent upon grid spacing and the number of access points to be included. According to one example, only access points that cover 0.2% or more of the environment, such as the office area 600 can be included in the database. According to another example, access points that cover 10% or more of the environment can be included in the database. This can reduce the size of the database and can increase overall accuracy in tests due to fewer extrapolation errors.

For example, data can be collected via WLAN scans at 26 different locations, such as data collection locations 610 and 620, as shown in FIG. 6, with 60 scans per location, depending on the size of the area scanned. For this example, 173 total access points were detected while running a scan. The number of access points to be used in database generation can be limited based on the coverage area. For example, >=0.2% can yield 89 access points while >=10% can yield 42 access points. A grid can be generated to cover the region encompassing the data collection points. For example, 1 meter×1 meter grid points can provide high resolution. Grid points of 5 meters×5 meters can be more memory efficient without compromising accuracy. Other grid point resolutions can be used depending on desired accuracy and memory availability. RSSI mean and variance values can be calculated at each grid point via interpolation and extrapolation. Gaussian process regression can yield accurate interpolated means and variances, as in 810 and 820, but extrapolated means may be unreliable. Thus, extrapolated means can be calculated by fitting a linear decay model to the data via constrained nonlinear optimization, such as conjugate gradient descent as in 830. The interpolated and extrapolated means can be blended together to provide a smooth, continuous coverage map over the grid as in 840.

Figure 9:
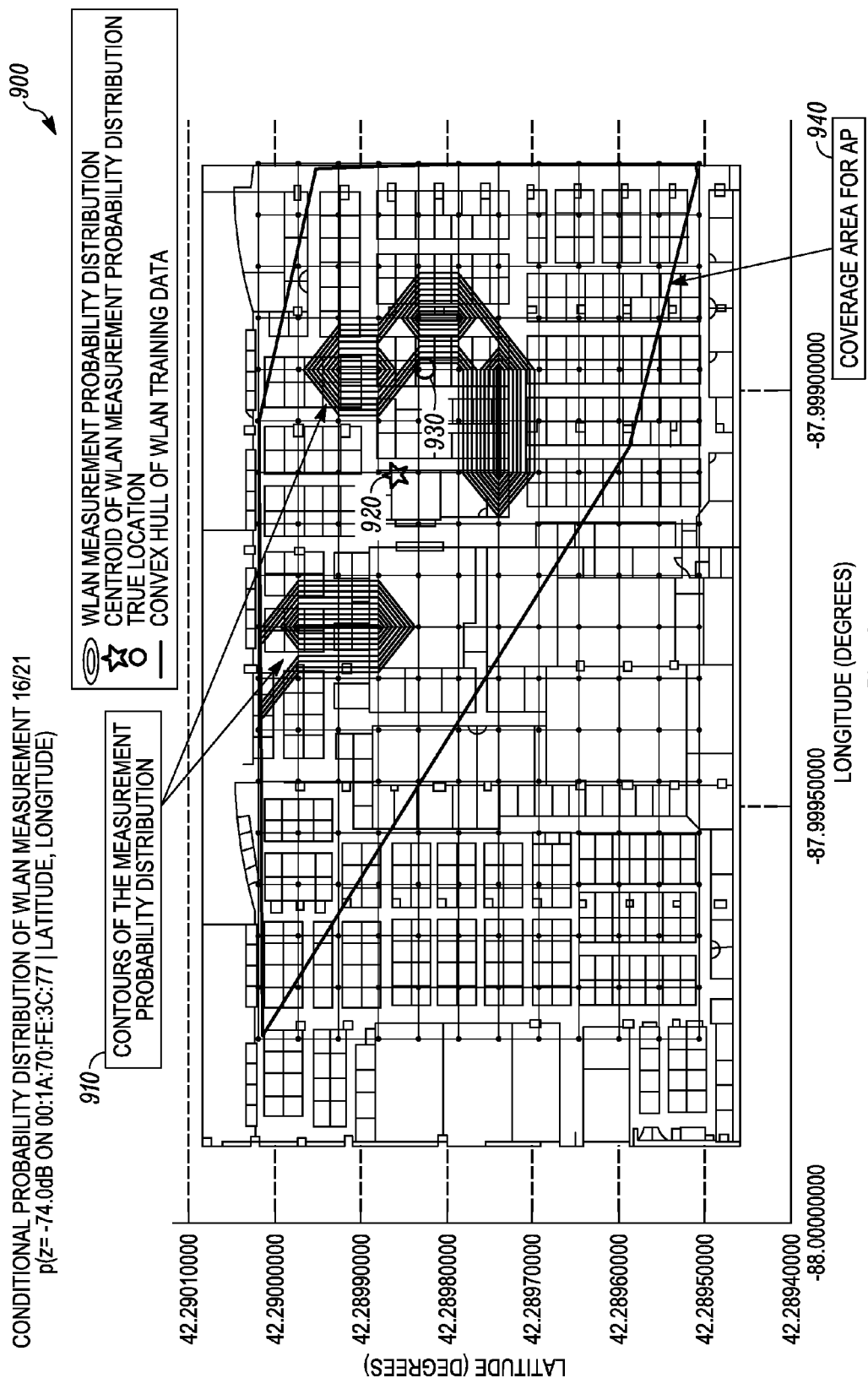
FIG. 9 is an example illustration of conditional probability distribution of WLAN measurements according to a possible embodiment.

FIG. 9 is an example illustration 900 of the conditional probability distribution of measuring a particular RSSI value, −74 dBm in this example, on a particular access point, specifically one with a BSSID of 00:1A:70:FE:3C:77 in this example, at various locations within office 600. The illustration 900 shows contours of a measurement probability distribution 910, a centroid location 920 of the device 110 based on the WLAN probability distribution, a true location 930 of the device 110, and a convex hull 940 of WLAN training data, such as a coverage area of the access point.

Figure 10:
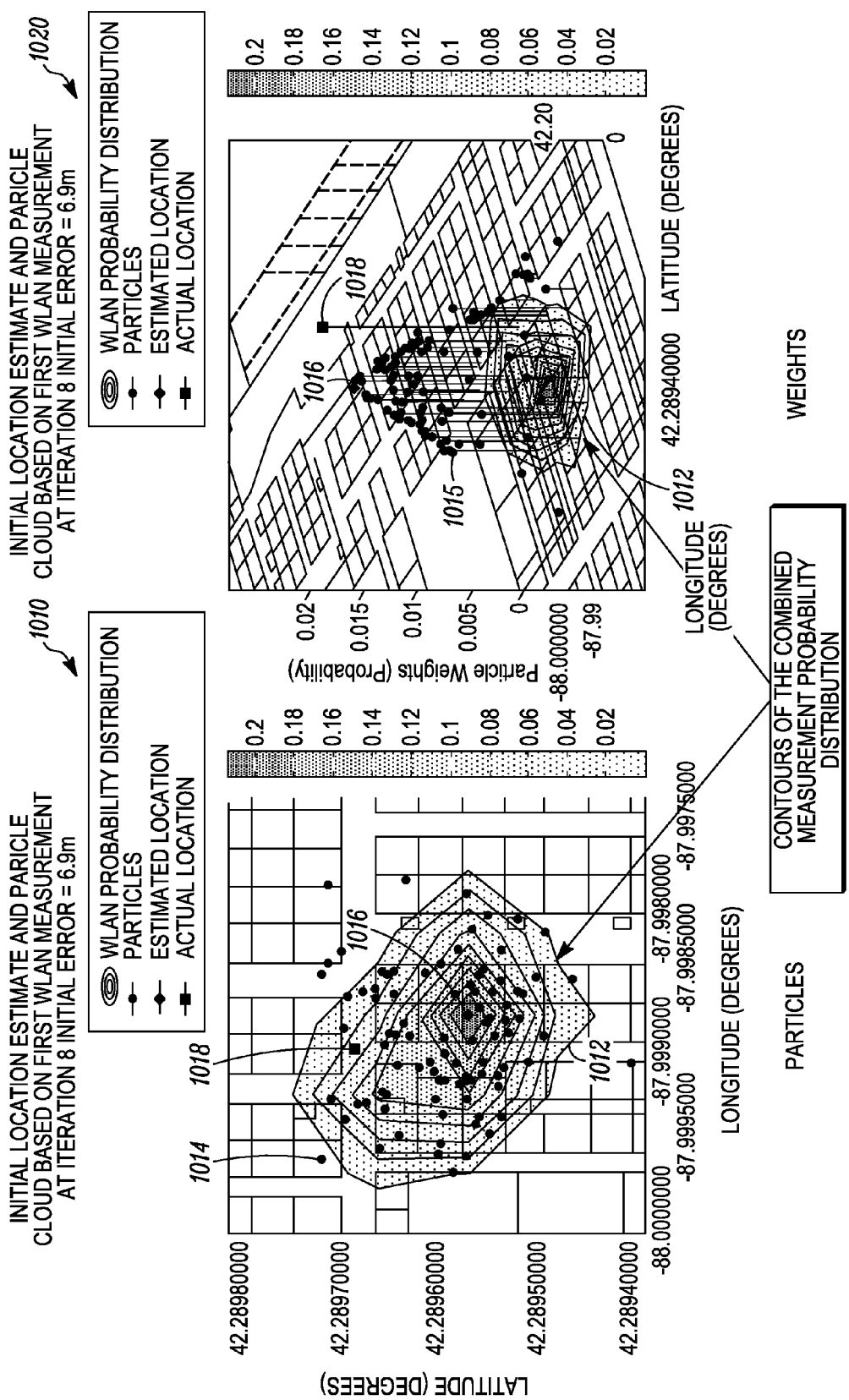
FIG. 10 is an example illustration of graphs for an initial location estimate and particle cloud to a possible embodiment.

FIG. 10 shows two views 1010 and 1020 of graphs for an initial location estimate and a particle cloud based on first WLAN measurements for multiple access points according to a possible embodiment. The graphs 1010 and 1020 can include a WLAN probability distribution 1012, such as contours of a combined measurement probability distribution, particles, such as particles 1014 and 1015, in a particle cloud, an estimated location 1016 of the device 110, and an actual location 1018 of the device 110. In graph 1010 the spread of the particle cloud indicating positional uncertainty can be clearly superimposed upon the contours of the WLAN measurement probability distribution. Graph 1020 shows how the WLAN measurement probability can affect the weights of the particles, as indicated by their heights along the z-axis. Those particles near the peak of the WLAN measurement probability distribution can have larger weights than those that are farther from the peak.

In operation, upon activation of a client location determination application, the device 110 can initialize location determination by calculating the initial device location and associated uncertainty from a first WLAN scan. The device 110 can then iteratively perform the following operations: The device 110 can update a dead reckoning position of the device 110, such as by determining a distance moved based on pedometer information since a last iteration or since initialization and by determining a heading from compass information. The device 110 can perform a WLAN scan of signal strengths. The device 110 can then combine the dead reckoning position and the WLAN scan via Bayesian estimation through a particle filter. For example, a particle filter can include a cloud of particles $\{x_i\}$ in the environment, such as the office area 600. Each particle, such as particle 1014, can represent a possible position of the device 110. The size of the cloud can reflect the amount of uncertainty in the position of the device 110. The cloud can be propagated forward using dead reckoning and dead reckoning errors can be modeled as process noise and incorporated into particle cloud updates.

According to a possible implementation, given a WLAN scan $Z=\{z^j\}$, where $z^j=(RSSI^j, BSSID^j)$, and where BSSID is a basic service set identifier, the device 110 can find the most likely location within the grid 720 by calculating the centroid of the product of the measurement probabilities for each access point over the grid 720. A probability of a single measurement $z^j$ at grid point $g_{x,y}$ can be $p(z^j|g_{x,y})=N(z^j;\mu_{x,y}, \sigma_{x,y})$, where $N(z^j;\mu_{x,y},\sigma_{x,y})$ is the probability of $z^j$ given a normal distribution with mean $\mu_{x,y}$ and variance $\sigma_{x,y}$, and a probability of all measurements Z at $g_{x,y}$ can be $\Pi_j p(z^j|g_{x,y})$. The device 110 can calculate this product at each grid point and can normalize the products to obtain a probability mass function over the entire grid. The centroid of the mass function can be the most likely location given the measurement set Z, such as E[x,y|Z].

Figure 11:
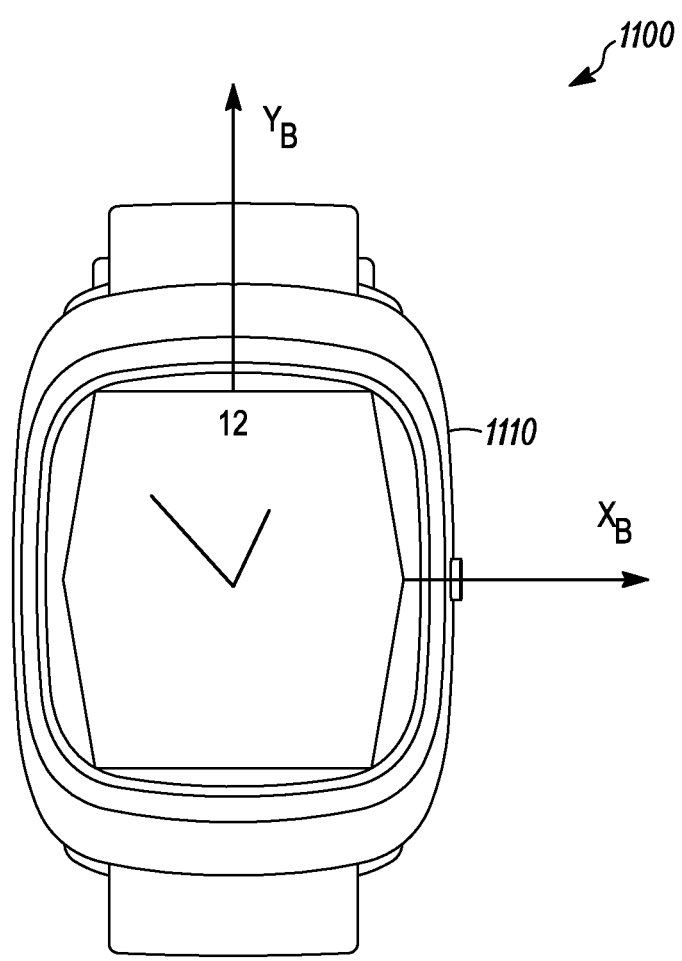
FIG. 11 is an example illustration of a watch according to a possible embodiment.

FIG. 11 is an example illustration of a watch 1100, such as the device 110, according to a possible embodiment. The watch 1100 can ascertain its location using a process based on the measured wireless network signal strengths discussed in some embodiments, based on the sensed movement of the watch 1100 discussed in some embodiments, and based on Bayesian filtering discussed in some embodiments. While some embodiments may employ features of the watch 1100 for illustrative purposes, such embodiments and other embodiments can be applied to any personal portable wireless communication device, regardless of whether it is worn on a user's wrist.

The watch 1100 can have a body 1110 and can include components of the wireless communication device 200. For example, the watch 1100 can include the compass 294, which can be mounted so that the body 1110 can have a body-frame with an x-axis, $x_B$, and a y-axis, $y_B$, where the y-axis can be positive in the direction of 12:00 on the watch 1100 and the x-axis can be positive in the direction of 3:00 on the watch 1100 according to a possible embodiment. The watch 1100 can calculate a heading, such as a movement direction, between magnetic north and the projection of the body-frame y-axis $y_B$ onto a world-frame $x_W$-$y_W$ plane. The watch 1100 can include the accelerometer 292 and the watch 1100 can provide low-pass filtering of the accelerometer output to provide a gravity vector in the body-frame. Components of gravity, g, in the body-frame can be used to provide tilt and orientation angles of the watch 1100.

Figure 12:
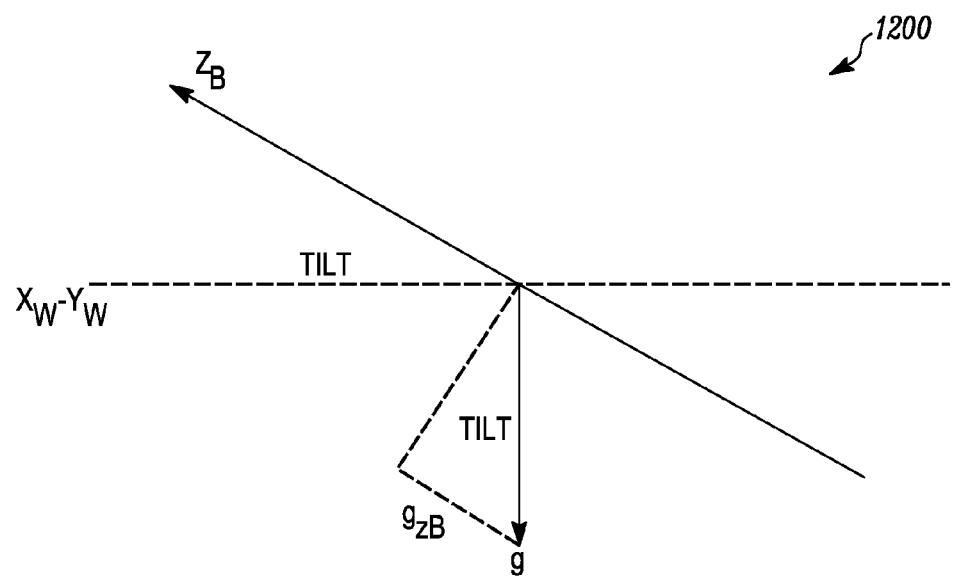
FIG. 12 is an example illustration of accelerometer-based tilt of a watch according to a possible embodiment.

FIG. 12 is an example illustration of accelerometer-based tilt 1200 of the watch 1100 according to a possible embodiment. The watch 1100 can use an accelerometer, such as the accelerometer 294 from the device 200, to measure its tilt between the world-frame horizontal x-y plane, $x_W$-$y_W$, and the body-frame z-axis, $z_B$, where tilt=$\sin^{-1}(g_{zB}/|g|)$. Since the body-frame z-axis can point out of the watch 1100 face, when the watch is vertical, the tilt can be 0°.

Figure 13:
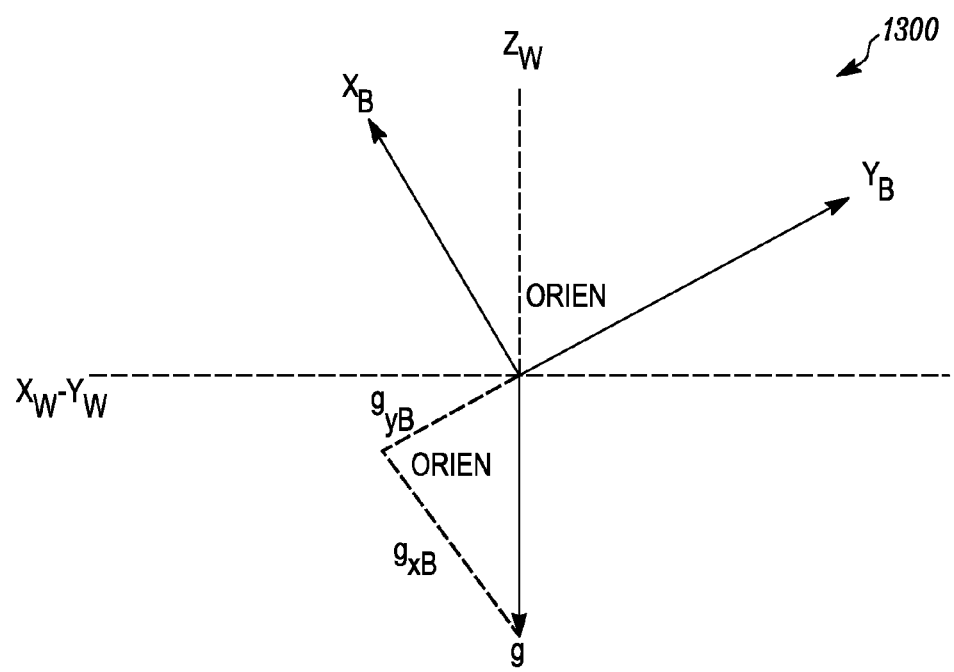
FIG. 13 is an example illustration of accelerometer-based orientation of a watch according to a possible embodiment.

FIG. 13 is an example illustration of accelerometer-based orientation 1300 of the watch 1100 according to a possible embodiment. The watch 1100 can measure orientation with respect to the projection of gravity in the body-frame $x_B$-$y_B$ plane, where $\tan(\text{orien})=g_{xB}/g_{yB}$ and orien=a tan $2(g_{xB}, g_{yB})$ where a tan 2 is the two-argument arctangent function. The orientation may be undefined when the tilt is ±90°.

The watch 1100 can make heading calculations using the tilt and orientation angles. For example, the watch 1100 can use tilt and orientation angles determined from the accelerometer to distinguish between different use cases while a user is walking and navigating. One case can be when a user is walking with the user's arm out in front, such as when the user is looking down at the watch 1100 while walking. Another case can be when the user is walking with the user's arm at the user's side.

For a case where the user's arm is out in front, the projection of the body frame y-axis in the world-frame x-y plane can point in the direction of the user's motion, regardless of whether the watch is worn on the left wrist or the right wrist. The range of tilt angles for this case can be 30° or greater and the true heading can be the compass heading.

For a case where the user's arm is at the user's side, the projection of the body-frame y-axis in the world-frame x-y plane can point in the opposite direction to the user's motion, regardless of wrist. In this case, the tilt angles can be much less than 30° and can be closer to 0°. The orientation angles can vary in magnitude from 60° to 179° on either wrist and in sign, orientation angles on the right wrist can be positive while those on the left wrist can be negative. The watch 1100 can use this information to determine upon which wrist, left or right, the user is wearing watch 1100.

Figure 14:
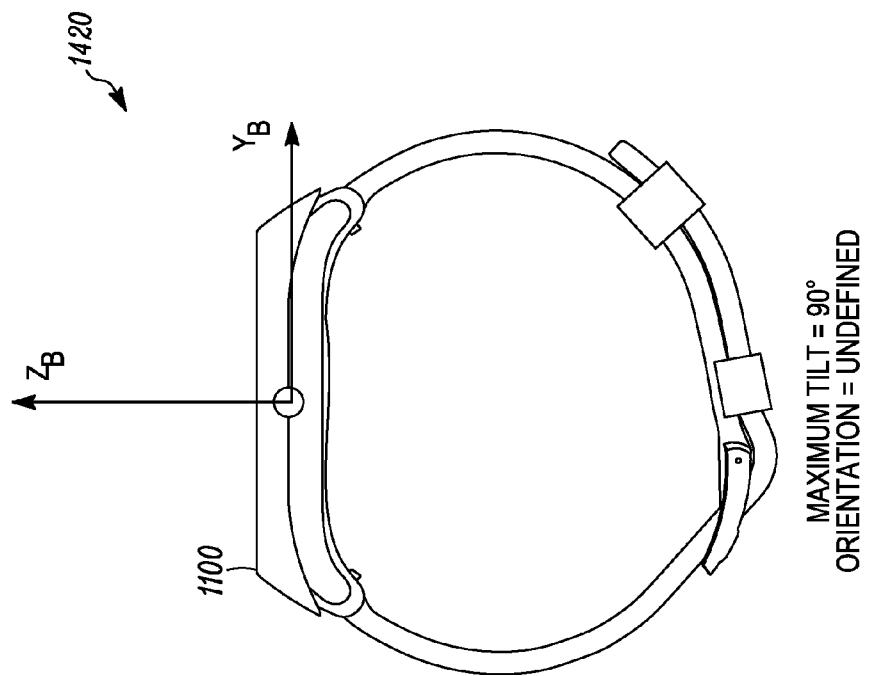
FIG. 14 is an example illustration of watch orientations according to a possible embodiment.
Figure 14:
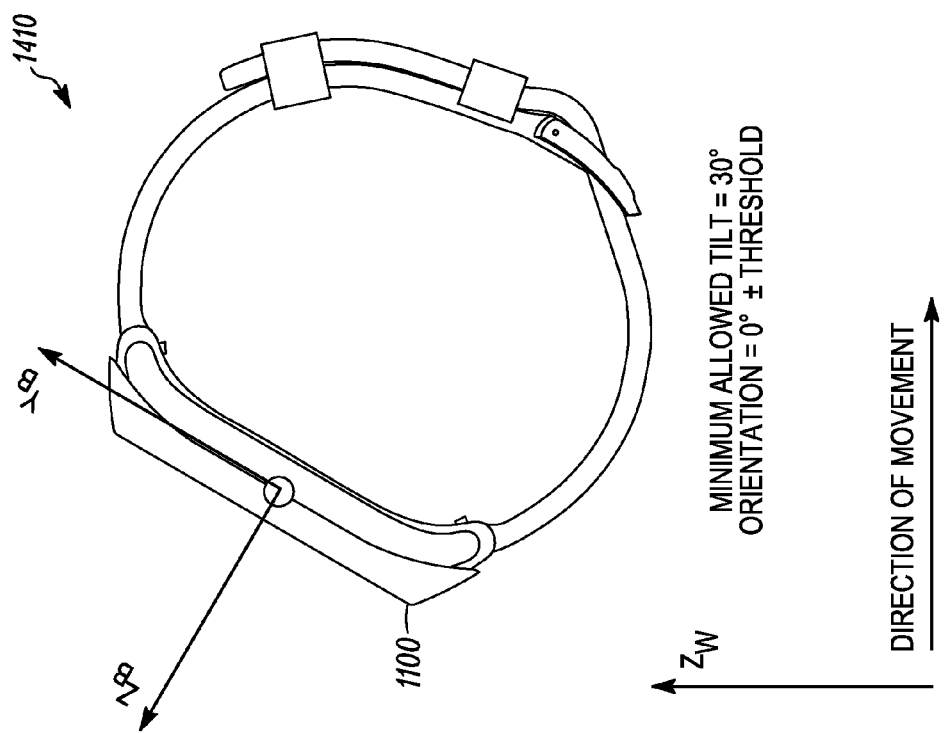

FIG. 14 is an example illustration of watch orientations 1410 and 1420 for a case where a user's arm wearing the watch 1100 is out in front, such as when a user is looking at the watch 1100, while walking or otherwise moving in a direction of movement perpendicular to a world z-axis, $z_W$, according to a possible embodiment. The watch 1100 can measure a heading with respect to $y_B$, which can be in the same direction to the watch 1100 motion, where the true heading of the watch 1100 can be equal to a heading determined by the compass 294. For the orientation 1410, a minimum allowed tilt can be 30° and an orientation can be 0°±some threshold. For the orientation 1420, a maximum tilt can be 90° and an orientation can be undefined.

Figure 15:
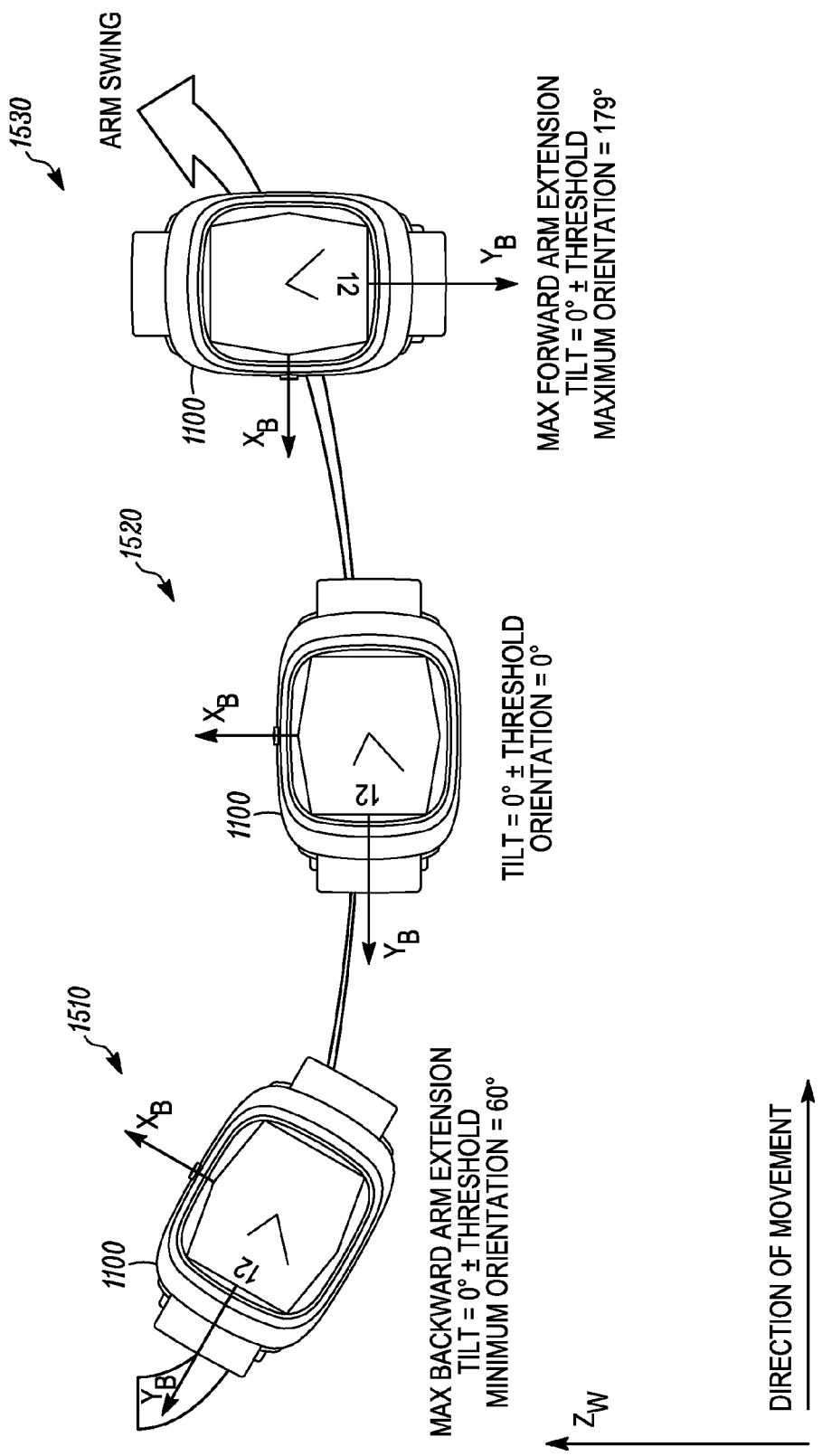
FIG. 15 is an example illustration of watch orientations according to a possible embodiment.

FIG. 15 is an example illustration of watch orientations 1510, 1520, and 1530 for a case where a user's right arm wearing the watch 1100 is swinging at the user's side while the user is walking or otherwise moving in a direction of movement perpendicular to a world z-axis, $z_W$, according to a possible embodiment. The watch 1100 can measure a watch movement heading with respect to $y_B$ in the opposite direction to the user's movement. For example, the true heading can be a heading measured by a watch compass, such as the compass 294, plus 180°. The orientation 1510 can correspond to a user's maximum backward arm extension where a tilt can be 0°±threshold and a minimum orientation can be 60°. For the orientation 1520, the tilt can be 0°±threshold and the orientation can be 90°. The orientation 1530 can correspond to a user's maximum forward arm extension where the tilt can be 0°±threshold and the maximum orientation can be 179°.

Figure 16:
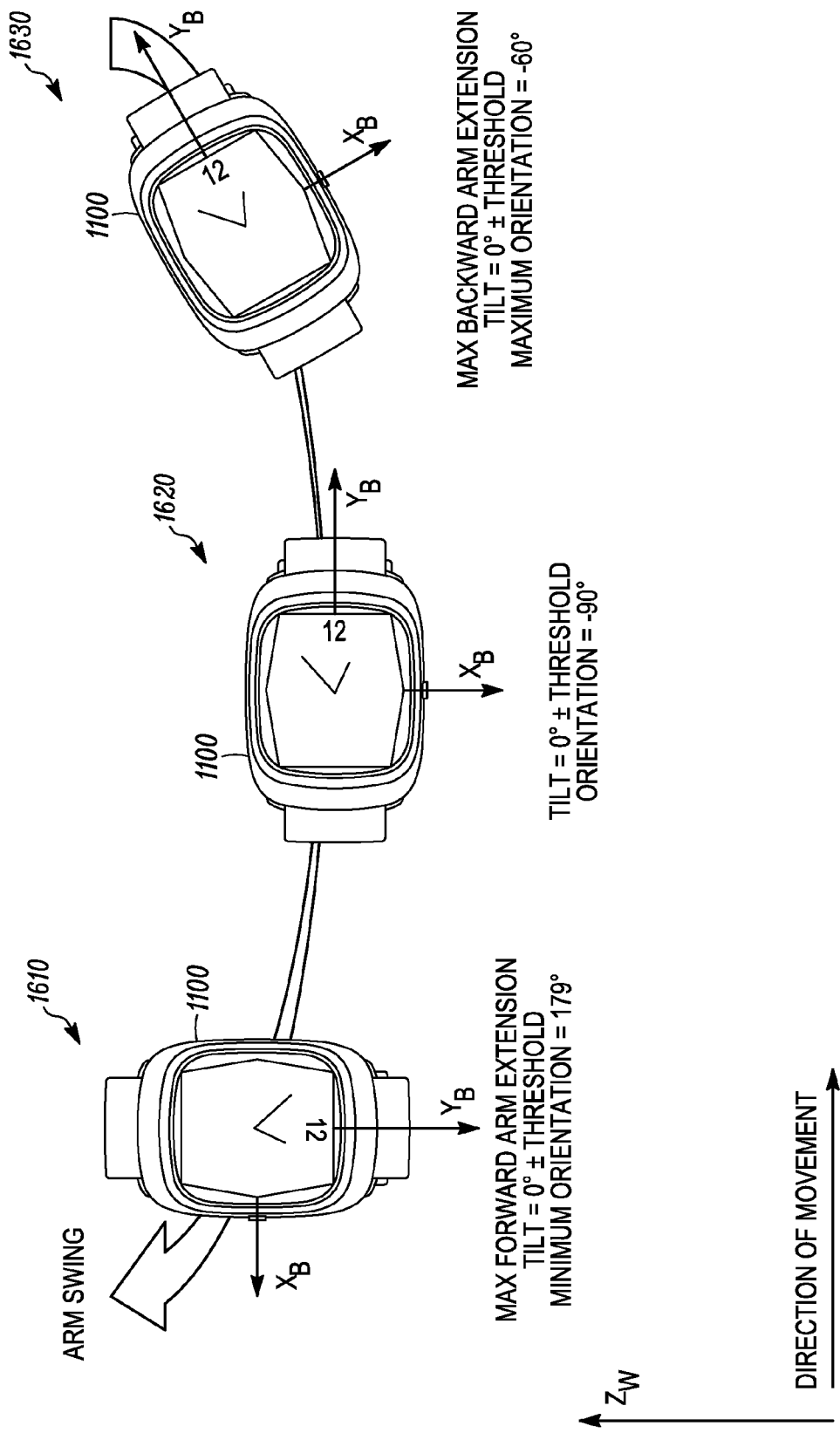
FIG. 16 is an example illustration of watch orientations according to a possible embodiment.

FIG. 16 is an example illustration of watch orientations 1610, 1620, and 1630 for a case where a user's left arm wearing the watch 1100 is swinging at the user's side while the user is walking or otherwise moving in a direction of movement perpendicular to a world z-axis $z_W$ according to a possible embodiment. The watch 1100 can measure a watch movement heading with respect to $y_B$ in the opposite direction to the user's movement. For example, the true heading can be a heading measured by watch compass 294 plus 180°. The orientation 1610 can correspond to a user's maximum forward arm extension where the tilt can be 0°±threshold and the maximum orientation can be −179°. For the orientation 1620, the tilt can be 0°±threshold and the orientation can be −90°. The orientation 1630 can correspond to a user's maximum backward arm extension where a tilt can be 0°±threshold and a minimum orientation can be −60°.

Figures 17A, 17B:
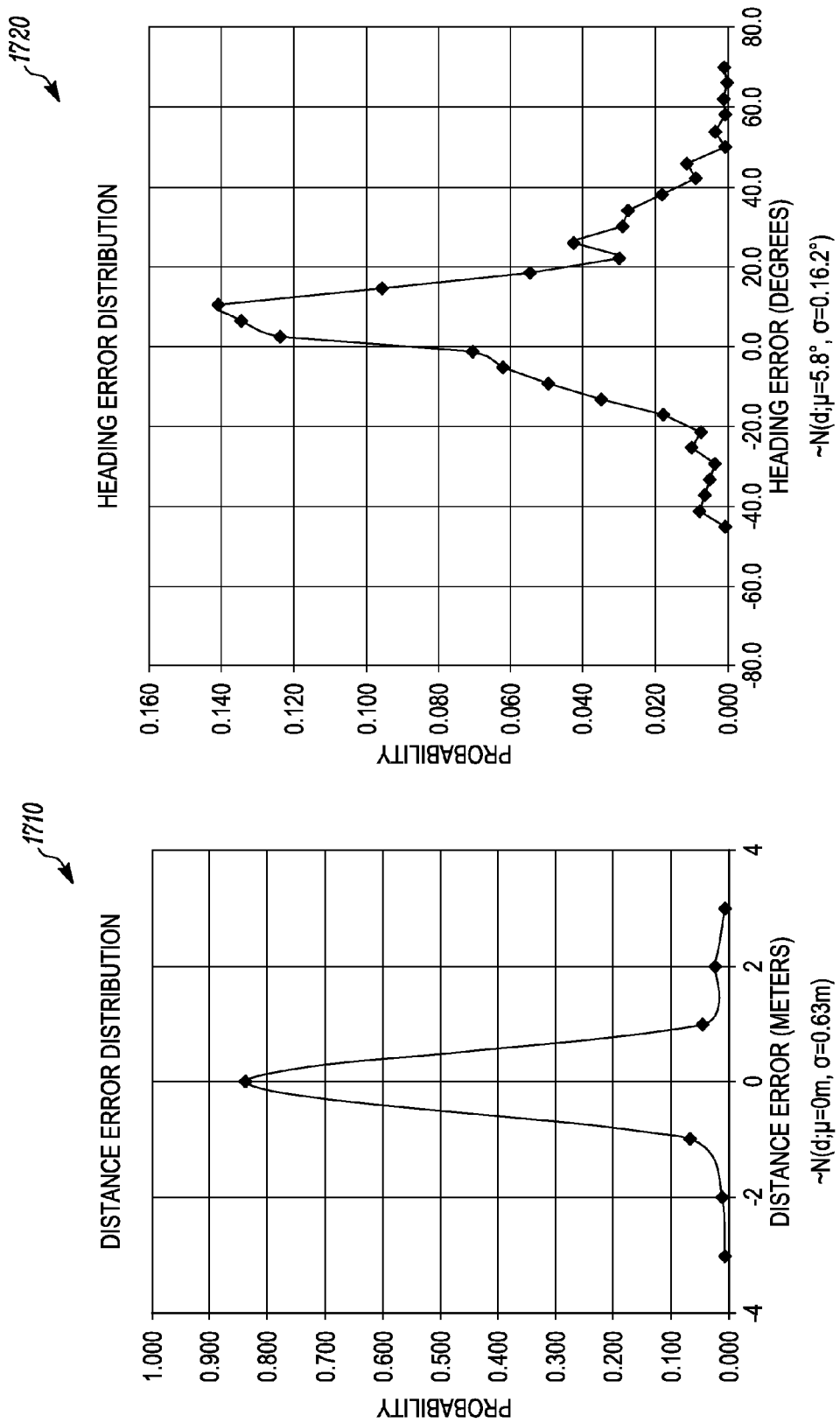
FIGS. 17A and 17B are example illustrations of graphs of dead reckoning errors according to a possible embodiment.

FIGS. 17A and 17B are example illustrations of graphs of dead reckoning errors including a distance error distribution graph 1710 and a heading error distribution graph 1720 according to a possible embodiment. The device 110 can model the dead reckoning errors as process noise and incorporate the errors into particle cloud updates.

Figure 18:
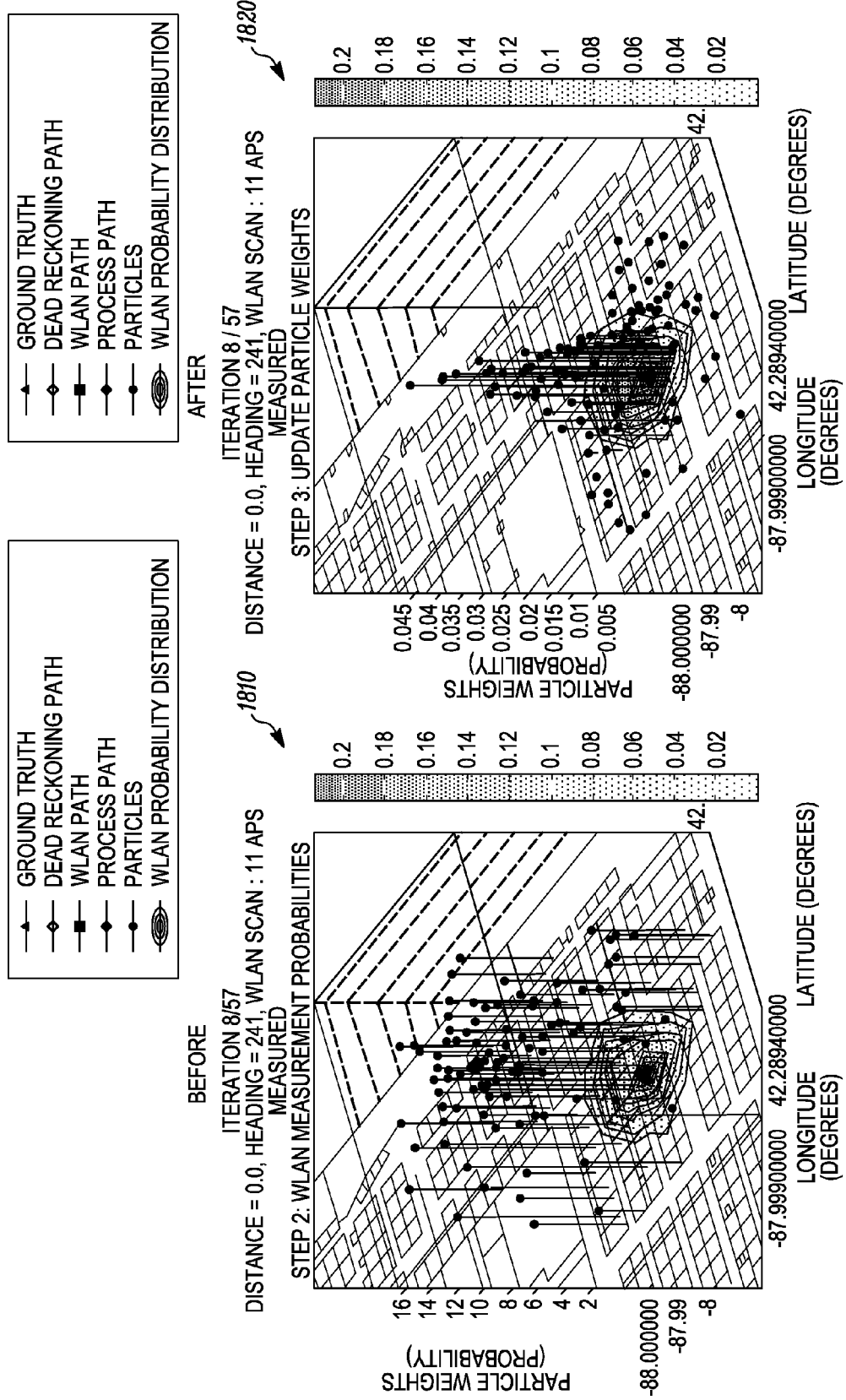
FIG. 18 is an example illustration of particle weights according to a possible embodiment.

FIG. 18 is an example illustration of particle weight updates including a particle weight distribution before 1810 incorporating WLAN signal strength measurements and a particle weight distribution after 1820 incorporating WLAN signal strength measurements according to a possible embodiment. The particles' weights, such as the heights in the illustrations, appear uniformly distributed before 1810 incorporating WLAN signal strength measurements and can reflect the WLAN measurement probability distribution after 1820 incorporating WLAN signal strength measurements. For example, the dead reckoning errors can be mitigated by WLAN signal strength scans $Z=\{z_j\}$. A measurement probability can be calculated for each particle $p(Z|x_i)$ and each particle can track its own position in the grid. The mean and variance for the measurement probabilities can be determined by performing a bilinear interpolation of the values at the 4 nearest grid positions. Each particle can have a weight $\{w_i\}$ that is its probability. The initial distribution of particles and weights can be based on WLAN localization using the initial WLAN scan. Particles for which the measurement probability is high can increase their weights while those with low measurement probabilities can decrease their weights. The estimated position at each iteration can be the expected value of the location given the particles and their weights: $\Sigma_i x_i w_i$.

Figure 19:
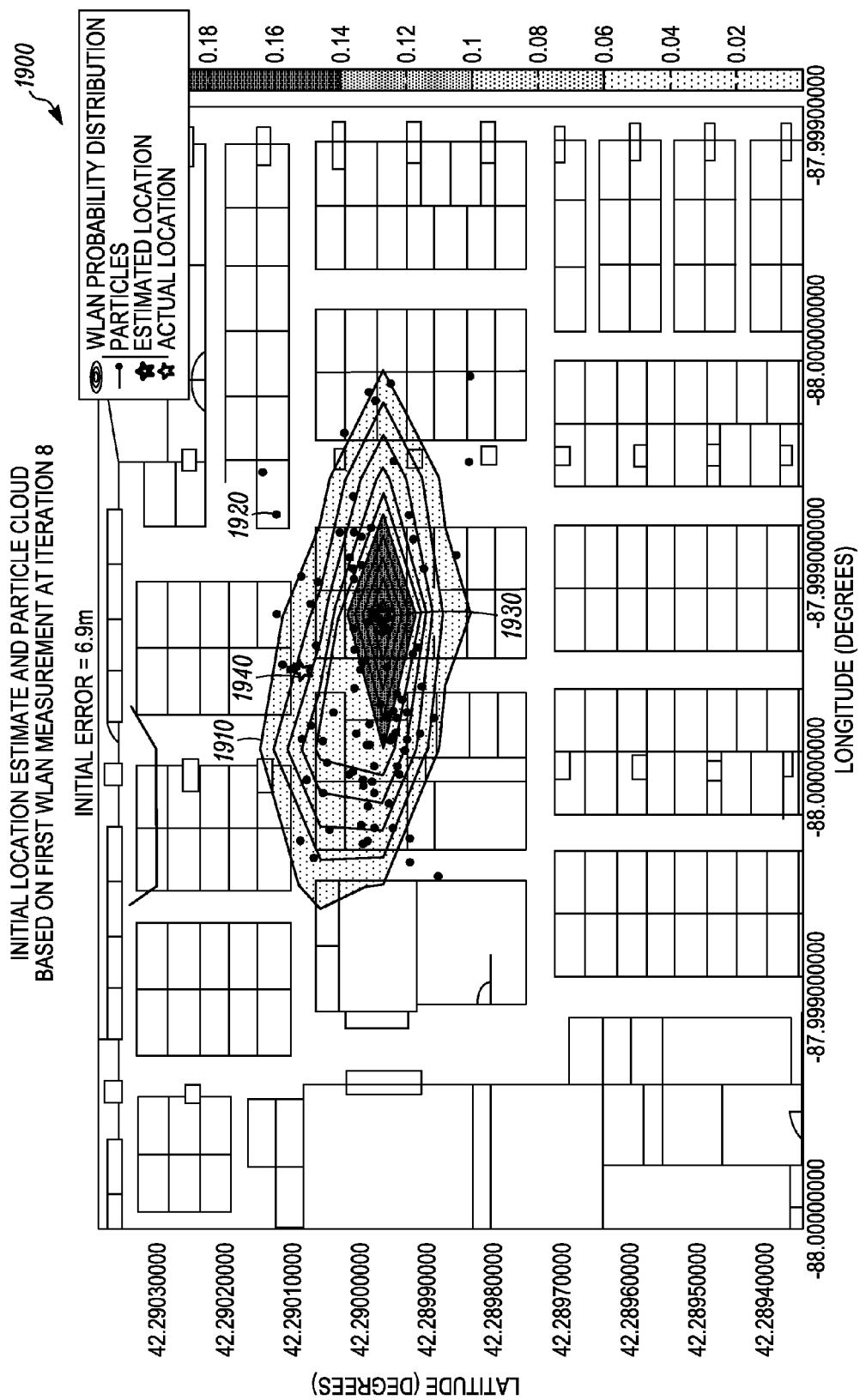
FIG. 19 is an example illustration of an office area for an example short walk with a device according to a possible embodiment.

FIG. 19 is an example illustration of an office area 1900 showing a WLAN probability distribution 1910, particles, such as particle 1920, an initial device location estimate 1930, and an actual device location 1940 for an example short walk with the device 110 according to a possible embodiment.

Figure 20:
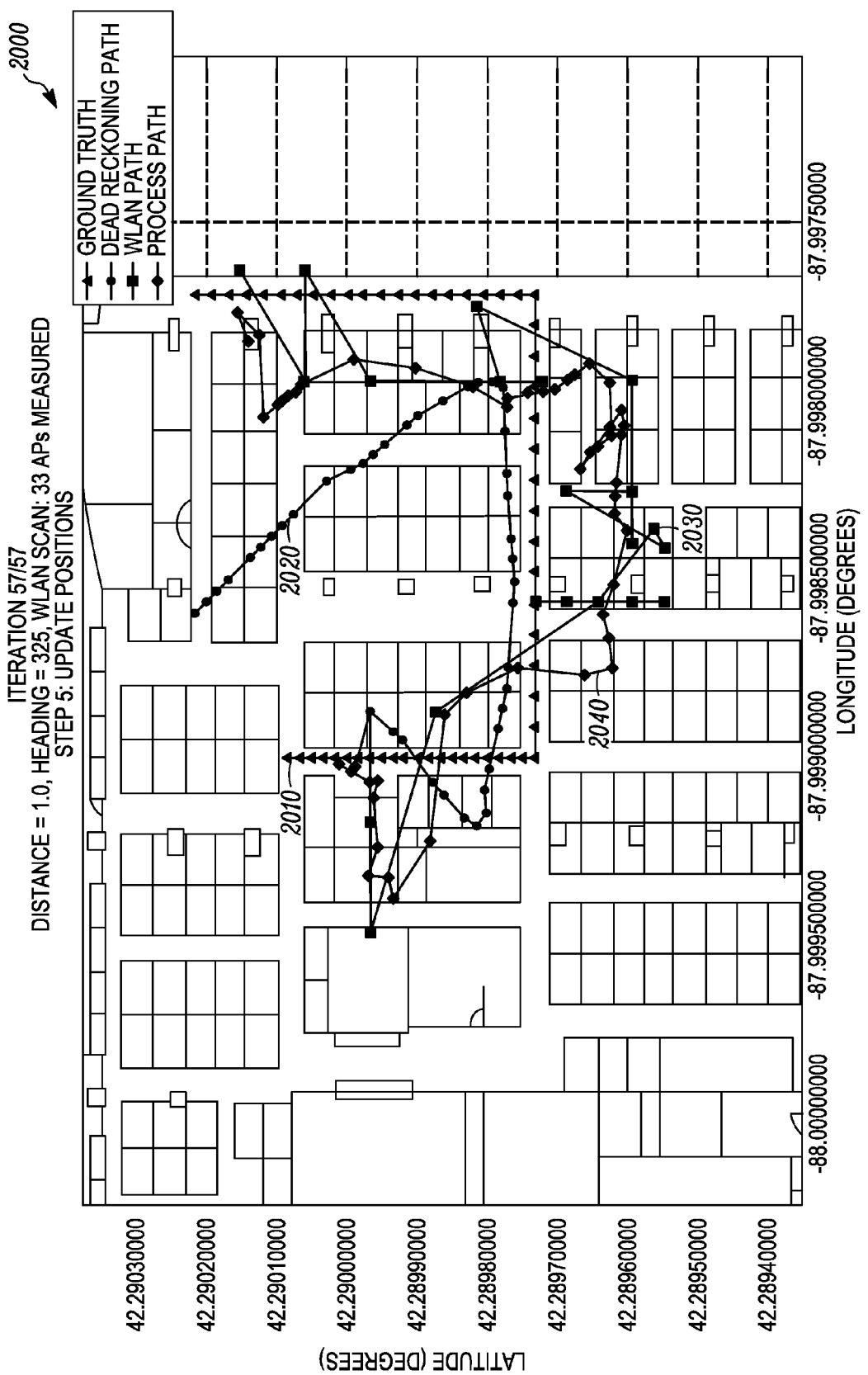
FIG. 20 is an example illustration of an office area showing resulting paths of a short walk according to a possible embodiment.

FIG. 20 is an example illustration of an office area 2000 showing resulting paths of the short walk according to a possible embodiment. The paths include a ground truth path 2010, such as the actual path of the device 110 taken on the short walk. The paths include a dead reckoning path 2020 of the walk determined from dead reckoning measurements. The paths include a WLAN path 2030 of the walk determined from WLAN measurements. The paths include a path 2040 of the walk determined from combining the dead reckoning measurements and the WLAN measurements using methods described above. As shown, the dead reckoning path 2020 diverges from the ground truth path 2010 if it is not corrected.

Figure 21:
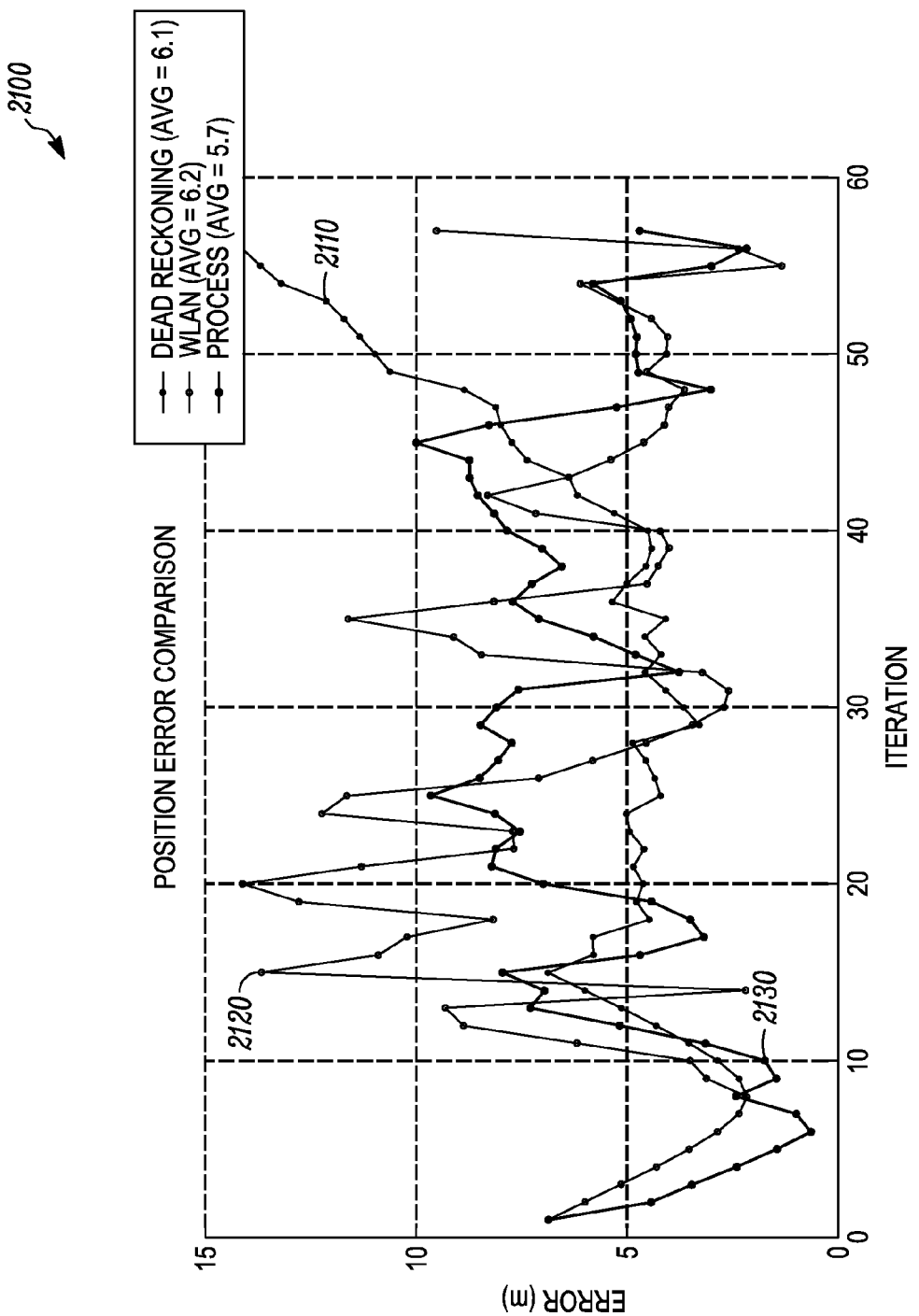
FIG. 21 is an example graph of position errors of different path measurements of a short walk according to a possible embodiment.

FIG. 21 is an example graph 2100 of position errors of different path measurements of the short walk according to a possible embodiment. The position errors include dead reckoning position measurement errors 2110, WLAN position measurement errors 2120, and measurement errors 2130 from combining the dead reckoning measurements and the WLAN measurements. The measurement errors 2130 from the combination have the lowest average and maximum errors, whereas the dead reckoning measurement errors 2110 show an unbounded rise at the end.

Figure 22:
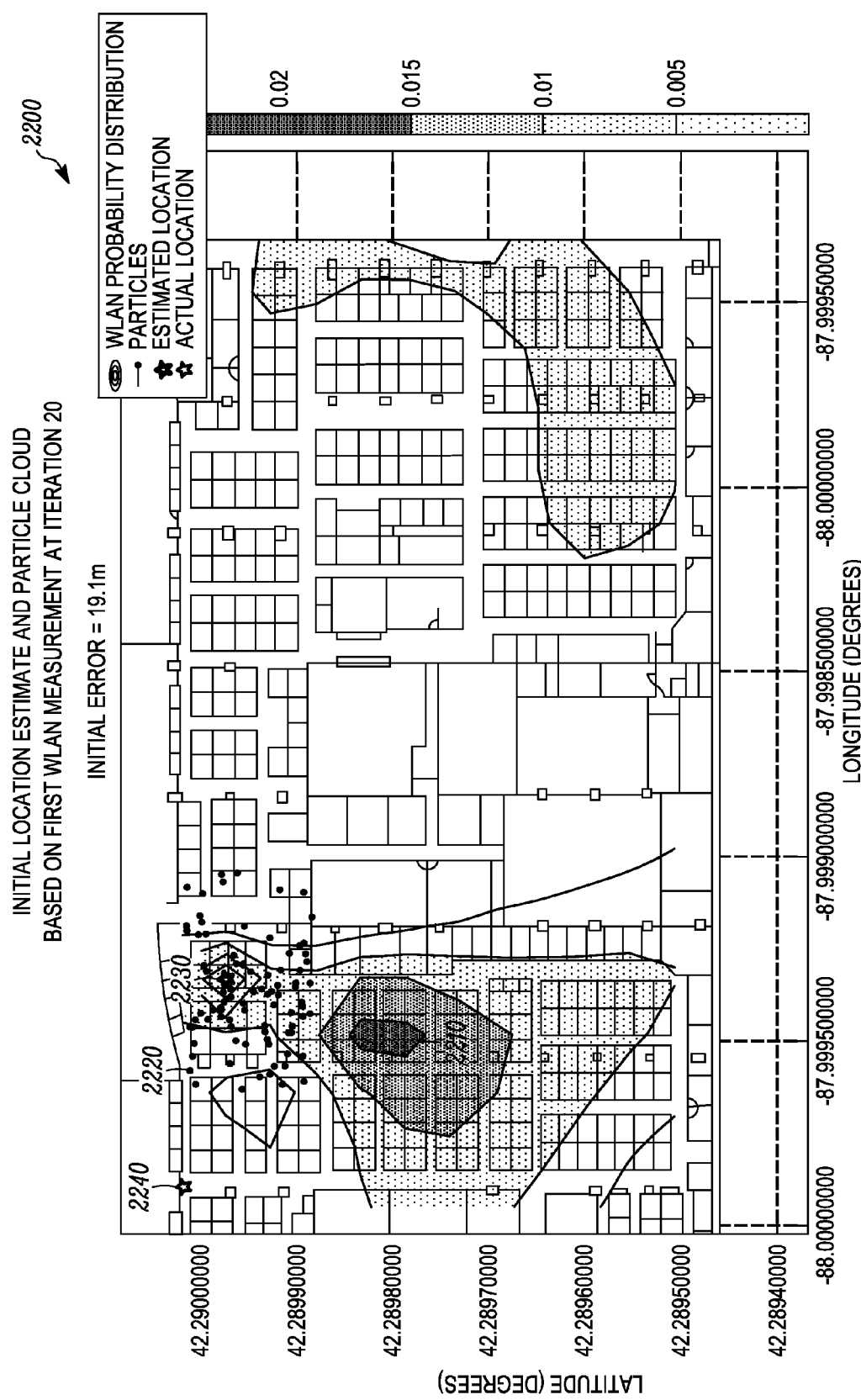
FIG. 22 is an example illustration of an office area for an example long walk with a device according to a possible embodiment.

FIG. 22 is an example illustration of an office area 2200 showing a WLAN probability distribution 2210, particles, such as particle 2220, an initial device location estimate 2230, and an actual device location 2240 for an example long walk with the device 110 according to a possible embodiment.

Figure 23:
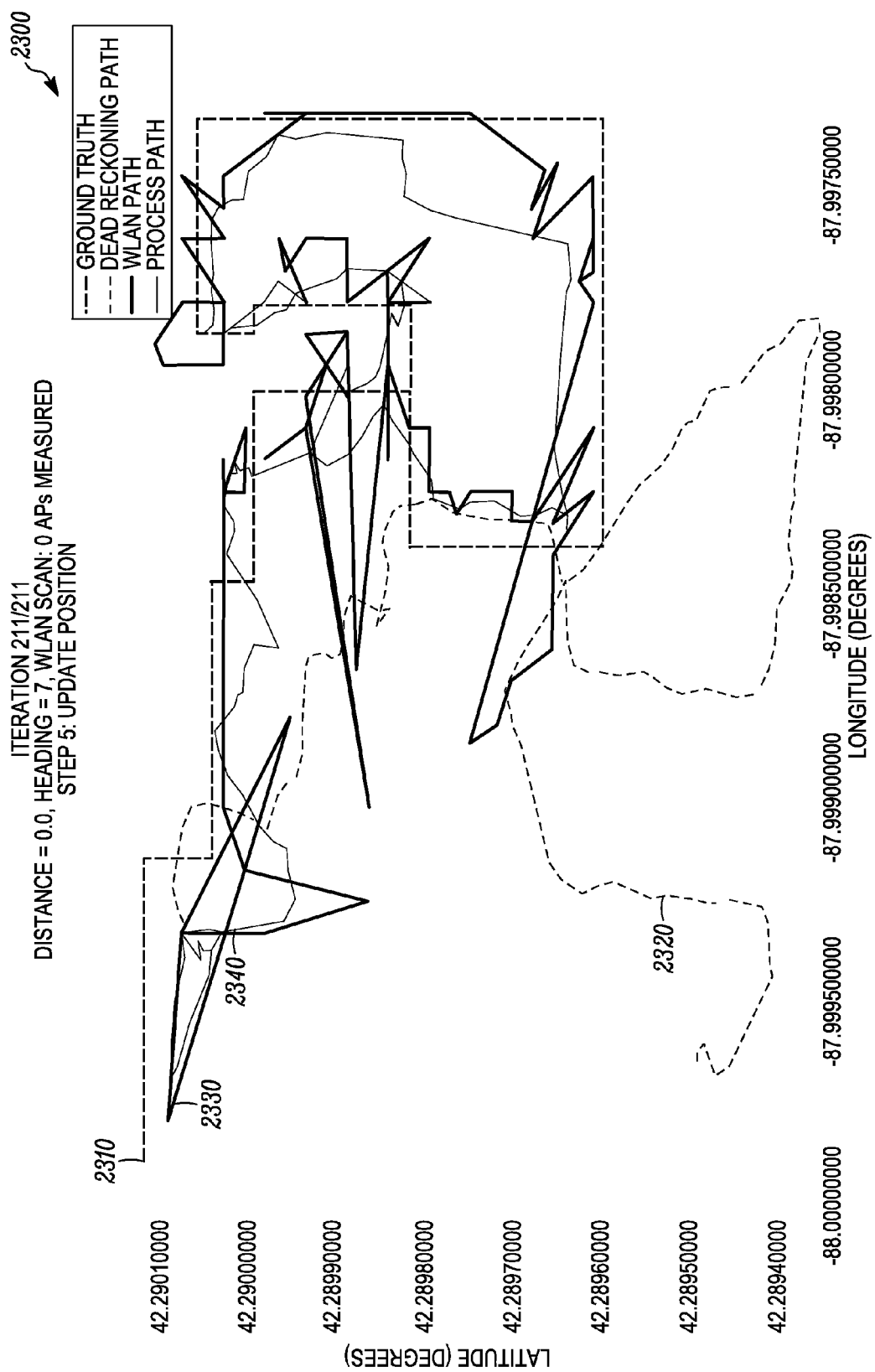
FIG. 23 is an example illustration of an office area showing resulting paths of a long walk according to a possible embodiment.

FIG. 23 is an example illustration of an office area 2300 showing resulting paths of the long walk according to a possible embodiment. The office area 2300 can correspond to the office area 2200 of FIG. 22 with the office layout removed to more clearly highlight the paths. The paths include a ground truth path 2310, such as the actual path of the device 110 taken on the long walk starting at 42.29012 degrees latitude and 87.99980 degrees longitude. The paths include a dead reckoning path 2320 of the walk determined from dead reckoning measurements. The paths include a WLAN path 2330 of the walk determined from WLAN measurements. The paths include a process path 2340 of the walk determined from a process of combining the dead reckoning measurements and the WLAN measurements using methods described above. As shown, the dead reckoning path 2320 diverges from the ground truth path 2310 if it is not corrected using the combination process and the WLAN path 2330 resembles a random walk instead of the ground truth path 2310 if it is not corrected using the combination process.

Figure 24:
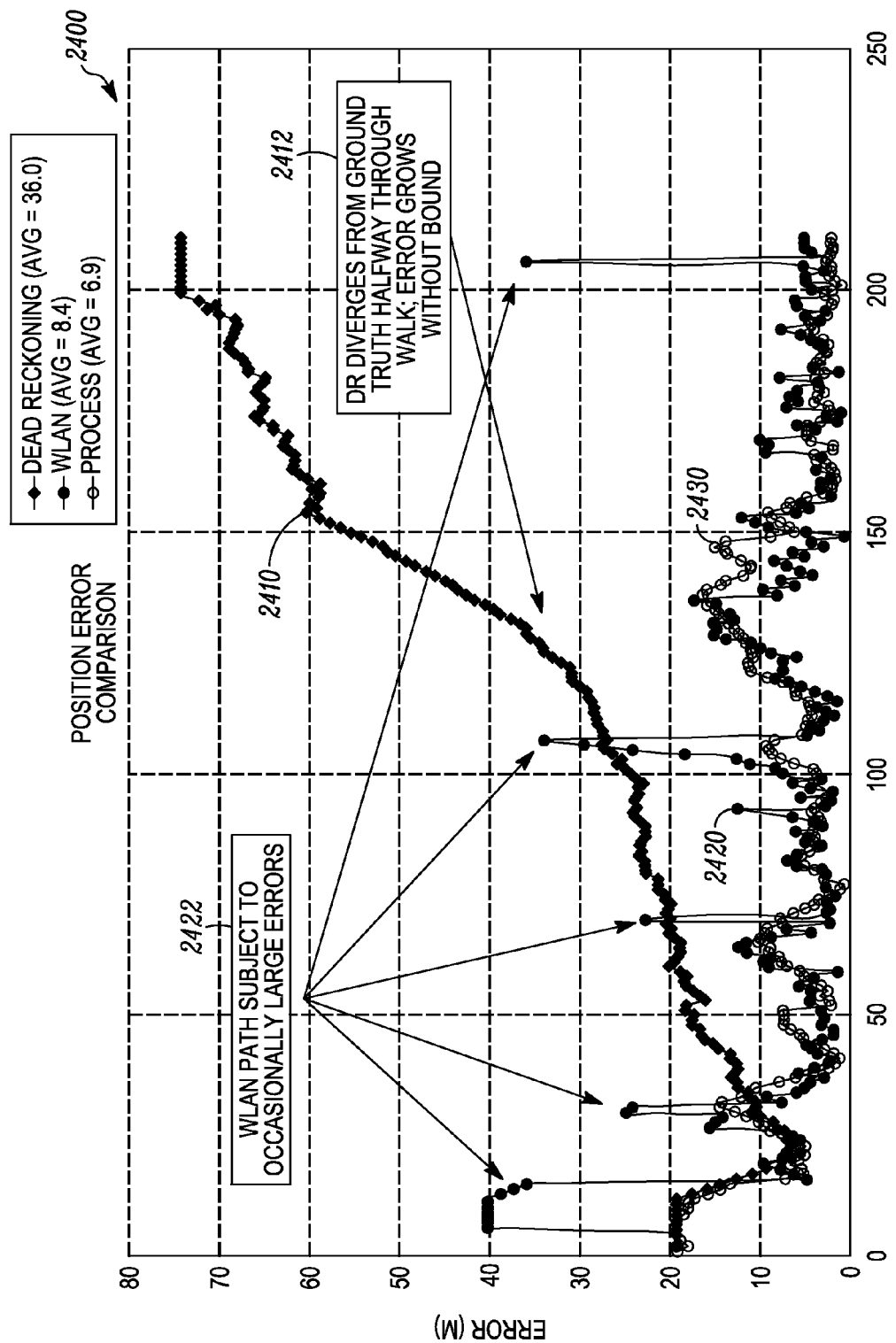
FIG. 24 is an example graph of position errors of different path measurements of a long walk according to a possible embodiment.

FIG. 24 is an example graph 2400 of position errors of different path measurements of the long walk according to a possible embodiment. The position errors include dead reckoning position measurement errors 2410, WLAN position measurement errors 2420, and measurement errors 2430 from combining the dead reckoning measurements and the WLAN measurements. As compared to the combination errors 2430, the dead reckoning measurement errors 2410 show a large divergence from the ground truth path 2310 halfway through the walk 2412 and an unbounded rise at the end. Also the WLAN errors 2420 show the WLAN path 2330 is subject to occasionally large errors 2422.

Different embodiments can calculate WLAN measurement probabilities p(z|x) in different manners. For example, according to a possible embodiment, training data can be collected to characterize the environment and generate a WLAN coverage map. This coverage map can be used to calculate the measurement probabilities. According to another possible embodiment, training data collection may not be performed and coverage maps may not be generated. Instead, the locations of the WLAN access points can be provided. This access point location data can be used in conjunction with a Radio-Frequency (RF) propagation model to calculate the measurement probabilities. For example, an International Telecommunication Union (ITU) Indoor Propagation Model (ITU-R P.1238-7) can be used where:

$$z = P_t - P_f - 20 \log_{10}(f) - N \log_{10}(d) + 28 \qquad (1)$$

and where:

z can be a received signal strength, such as measured RSSI, in dBm;

$P_t$ can be a transmitted power in dBm (by specification, max=30 dBm);

$P_f$ can be a floor penetration loss factor;

f can be a frequency in MHz;

N can be a distance power loss coefficient; and d can be a distance between the access point and the receiver in meters.

The measured variables can be z and f. Assumptions can be made about the values of the remaining variables and their uncertainties can be incorporated into the model. For example, it can be assumed that the transmitted power is set to its maximum value to maximize coverage: $P_t$=30 dBm. It can further be assumed that all access points are on the same floor as the receiver, so $P_f$=0 dBm. According to the ITU specification, the distance power loss coefficient can very nearly be a constant value of N=30 for office environments over the WLAN frequency bands of 2.4 GHz and 5.2 GHz. The distance d can be the distance between the location of the access point and the particle for which the measurement probability is being calculated. The uncertainties can be incorporated in $P_t$ and $P_f$ by the addition of a new variable α:

$$z = P_t - P_f - 20 \log_{10}(f) - N \log_{10}(d) + 28 - \alpha, \qquad (2)$$

where α can be a catch-all error term that can include not only the errors in $P_t$ and $P_f$ but also errors due to other effects, such multipath, shadow fading, and measurement noise.

Substituting the assumed values of the variables into the modified model can give:

$$z = 58 - 20 \log_{10}(f) - 30 \log_{10}(d) - \alpha. \qquad (3)$$

The mean and variance of the distribution of α can be estimated via a calibration procedure. For example, a user can be asked to visually locate at least one access point, position the device 110 at a known or adequately estimated distance from that access point, and collect a set of RSSI measurements $\{z_i\}$. Because d can be fixed and f can be measured, the distribution of $\{z_i\}$ can be related to the distribution of α. Specifically, the set $\{z_i\}$ can be converted into a set $\{\alpha_i\}$ and then the mean and variance of $\{\alpha_i\}$ can be calculated.

The measurement probabilities p(z|x) can then be calculated. The probability of measuring z at location x can be, by definition, equivalent to the probability of measuring z at a distance of d from the access point, i.e., p(z|x)=p(z|d). To calculate this, the expected value and variance of z at d can be used. The expected value can be the value of z given distance d in Eq. (3). From the calibration above, the variance of z can equal the variance of α. The measurement probability can then be:

$$p(z|x) = N(z; z(d), \sigma_\alpha), \qquad (4)$$

where N(z; z(d), $\sigma_\alpha$) can be a normal distribution with mean z(d) and standard deviation $\sigma_\alpha$.

Embodiments can combine dead reckoning and WLAN measurements to provide a better indoor position estimate than using either method alone. For example, dead reckoning can suffer from unbounded error growth over time and also from drift and errors in compass measurements, such as heading errors. WLAN location determination can also suffer from positioning problems. Embodiments can use a particle filter to represent positional uncertainty. A particle cloud can be propagated forward using dead reckoning measurements, such as distance from the pedometer and heading from the compass, subject to increasing uncertainty in position, such as when the particle cloud grows in size. For each particle, a WLAN measurement probability can be calculated conditioned on the particle's location. This calculation can use a WLAN database that can be calculated in advance via a training process. The particles with the lowest measurement probabilities can be removed via sequential importance sampling. All position estimates do not need to be maintained in the filter. For example, only the last position estimate or a set of previous position estimates can be maintained in the filter. As a further example, the last position estimate can be maintained by using particle filters operating under a first-order Markov assumption.

Some embodiments can combine noisy distances from an accelerometer-based pedometer and noisy headings from a gyro-compensated compass to produce a dead reckoning update. Some embodiments can operate under a first-order Markov assumption in which only the previous state can be retained, such as by using particle filtering. Some embodiments can also determine heading from a wrist-worn device and can determine which wrist the device is on. Some embodiments can employ data fusion of accelerometer, gyroscope, compass, and WLAN measurements through recursive Bayesian estimation. Some embodiments can combine a recursive Bayesian estimation method, with WLAN trilateration, with an ecompass heading on a wristwatch that is in-turn compensated for user orientation and arm movement. The determination of arm movement and orientation, relative to an ecompass heading, can be input into a Bayes filter to determine the location of a personal portable wireless communication device.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
sensing, using a plurality of movement sensors on a personal portable wireless communication device, movement of the personal portable wireless communication device;
measuring, by the personal portable wireless communication device, wireless network signal strengths; and
ascertaining, by a controller, a location of the personal portable wireless communication device based on the sensed movement of the personal portable wireless communication device and the measured wireless network signal strengths through Bayesian filtering, the ascertaining including identifying a region within which the personal portable wireless communication device may be located based on sensed movement measurements and uncertainties of the plurality of movement sensors, and assigning weights to a set of locations within the region, wherein the weights are based on a probability of measuring wireless network signal strength values at the locations within the region, and wherein the probability of measuring the wireless network signal strength values at the locations within the region is calculated by: calculating probabilities of measuring each individual wireless network signal strength value at the locations within the region so as to ascertain the location of the personal portable wireless communication device and calculating probabilities of measuring each wireless network signal strength value at the locations within the region by performing an interpolation of means and variances of a plurality of nearest neighbors.

2. The method of claim 1,
wherein the plurality of movement sensors on the personal portable wireless communication device include an accelerometer, and
wherein the sensed movement of the personal portable wireless communication device is based on a distance traversed based on readings from the accelerometer.

3. The method of claim 1,
wherein the plurality of movement sensors on the personal portable wireless communication device includes a compass, and
wherein the sensed movement of the personal portable wireless communication device is based on directional information based on readings from the compass.

4. The method of claim 1 wherein the personal portable wireless communication device comprises a wrist band including the plurality of movement sensors and a transceiver configured to communicate with a wireless network.

5. The method of claim 4, further comprising determining which wrist of a user the wrist band is located on based on readings from the plurality of movement sensors.

6. The method of claim 1, wherein measuring, by a personal portable wireless communication device, wireless network signal strengths comprises measuring received signal strength indicators of a wireless local area network.

7. The method of claim 1, wherein the Bayesian filtering comprises estimating the location of the personal portable wireless communication device based on a weighted sum of the locations within the region.

8. The method of claim 7,
wherein ascertaining a location of the personal portable wireless communication device comprises normalizing the weights so that a sum of the weights equals one, and
wherein assigning weights comprises assigning the normalized weights to the set of locations within the region.

9. The method of claim 1, wherein the probability of measuring a wireless network signal strength value at a location in the region is calculated by:
comparing the wireless network signal strength value to values in a wireless network signal strength database, where the wireless network signal strength database includes a grid of locations, where each location in the grid of locations is associated with a mean wireless network signal strength value and a wireless network signal strength variance value;
finding the plurality of nearest neighbors to the location in the database grid;
calculating the probability of measuring the wireless network signal strength value given a normal distribution with the interpolated mean and the variance values.

10. The method of claim 9, wherein performing an interpolation comprises performing a bilinear interpolation of the means and variances of four nearest neighbors.

11. The method of claim 7, wherein the probability of measuring a wireless network signal strength value at a location in the region is calculated by:
determining a location of at least one access point; and
calculating the probability of measuring a wireless network signal strength based on the access point location and based on radio-frequency propagation of a wireless network signal.

12. A personal portable wireless communication device comprising:
a plurality of movement sensors located on the personal portable wireless communication device;
a transceiver configured to communicate with a wireless network; and
a controller coupled to the plurality of movement sensors and coupled to the transceiver, the controller configured to sense, using the plurality of movement sensors, movement of the personal portable wireless communication device, configured to measure wireless network signal strengths of the wireless network received via the transceiver, and configured to ascertain a location of the personal portable wireless communication device based on the sensed movement of the personal portable wireless communication device and the measured wireless network signal strengths through Bayesian filtering by identifying a region within which the personal portable wireless communication device may be located based on sensed movement measurements and uncertainties of the plurality of movement sensors, and to assign weights to a set of locations within the region, wherein the weights are based on a probability of measuring wireless network signal strength values at the locations within the region, and wherein the probability of measuring the wireless network signal strength values at the locations within the region is calculated by: calculating probabilities of measuring each individual wireless network signal strength value at the locations within the region so as to ascertain the location of the personal portable wireless communication device and calculating probabilities of measuring each wireless network signal strength value at the locations within the region by performing an interpolation of means and variances of a plurality of nearest neighbors.

13. The device of claim 12,
wherein the plurality of movement sensors on the personal portable wireless communication device include an accelerometer, and
wherein the sensed movement of the personal portable wireless communication device is based on a distance traversed based on readings from the accelerometer.

14. The device of claim 12,
wherein the plurality of movement sensors on the personal portable wireless communication device includes a compass, and
wherein the sensed movement of the personal portable wireless communication device is based on directional information based on readings from the compass.

15. The device of claim 12, wherein the personal portable wireless communication device comprises a wrist band including the plurality of movement sensors.

16. The device of claim 12,
wherein the Bayesian filtering includes estimating the location of the personal portable wireless communication device based on a weighted sum of the locations within the region.

17. The device of claim 12, wherein controller is configured to calculate the probability of measuring a wireless network signal strength value at a location in the region by:
comparing the wireless network signal strength value to values in a wireless network signal strength database, where the wireless network signal strength database includes a grid of locations, where each location in the grid of locations is associated with a mean wireless network signal strength value and a wireless network signal strength variance value;
finding the plurality of nearest neighbors to the location in the database grid;
calculating the probability of measuring the wireless network signal strength value given a normal distribution with the interpolated mean and the variance values.

18. The device of claim 16, wherein the probability of measuring a wireless network signal strength value at a location in the region is calculated by:
determining a location of at least one access point; and
calculating the probability of measuring a wireless network signal strength based on the access point location and based on radio-frequency propagation of a wireless network signal.

19. A method comprising:
sensing, using a plurality of movement sensors on a personal portable wireless communication device, movement of the personal portable wireless communication device;
measuring, by the personal portable wireless communication device, wireless network signal strengths;
identifying a region within which the personal portable wireless communication device may be located based on sensed movement measurements and based on uncertainties of the plurality of movement sensors;
assigning weights to a set of locations within the region, where the weights are based on a probability of measuring wireless network signal strength values at the locations within the region; and
ascertaining a location of the personal portable wireless communication device based on probabilities of measuring each wireless network signal strength value within the region that are calculated by: calculating probabilities of measuring the wireless network signal strength values at locations within the region by performing an interpolation of means and variances of a plurality of nearest neighbors.

20. The method of claim 19, wherein the probability of measuring a wireless network signal strength value at a location in the region is calculated by:
comparing the measured wireless network signal strengths to values in a wireless network signal strength database, where the wireless network signal strength database includes a grid of locations, where each location in the grid of locations is associated with a mean wireless network signal strength value and a wireless network signal strength variance value;
finding the plurality of nearest neighbors to the location in the database grid;
calculating the probability of measuring the wireless network signal strength value given a normal distribution with the interpolated mean and the variance values.

21. The method of claim 19, wherein the probability of measuring a wireless network signal strength value at a location in the region is calculated by:
determining a location of at least one access point; and
calculating the probability of measuring a wireless network signal strength based on the access point location and based on radio-frequency propagation of a wireless network signal.

* * * * *